(12) United States Patent
Chen et al.

(10) Patent No.: US 10,834,248 B2
(45) Date of Patent: Nov. 10, 2020

(54) DEVICE, METHOD, AND GRAPHICAL USER INTERFACE FOR STARTING APPLICATION

(71) Applicant: Huawei Technologies Co., Ltd., Shenzhen (CN)

(72) Inventors: Xiaohan Chen, Shenzhen (CN); Yu Wang, Beijinig (CN); Chen Dong, Beijing (CN); Fan Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/473,518

(22) PCT Filed: Dec. 26, 2016

(86) PCT No.: PCT/CN2016/112192
§ 371 (c)(1),
(2) Date: Jun. 25, 2019

(87) PCT Pub. No.: WO2018/119605
PCT Pub. Date: Jul. 5, 2018

(65) Prior Publication Data
US 2020/0153955 A1  May 14, 2020

(51) Int. Cl.
*G06F 3/01* (2006.01)
*H04M 1/725* (2006.01)
*B60R 11/02* (2006.01)
*B60R 11/00* (2006.01)

(52) U.S. Cl.
CPC ..... *H04M 1/72575* (2013.01); *B60R 11/0241* (2013.01); *H04M 1/72527* (2013.01); *H04M 1/72569* (2013.01); *H04M 1/72577* (2013.01); *H04M 1/72583* (2013.01); *B60R 2011/0057* (2013.01); *H04M 2250/12* (2013.01)

(58) Field of Classification Search
None
See application file for complete search history.

(56) References Cited

U.S. PATENT DOCUMENTS 8,438,373 B2 * 5/2013 Rubin ............... H04M 1/72563
  713/1
9,075,436 B1 * 7/2015 Korn ....................... G06F 3/016
9,159,294 B2 * 10/2015 Le Grand ............. G06F 1/3265
(Continued)

FOREIGN PATENT DOCUMENTS

CN       101909940 A       12/2010
CN       102023016 A        4/2011
(Continued)

OTHER PUBLICATIONS

Machine Translation and Abstract of Chinese Publication No. CN205510165, Aug. 24, 2016, 8 pages.
(Continued)

*Primary Examiner* — Tuan A Tran
(74) *Attorney, Agent, or Firm* — Conley Rose, P.C.

(57) ABSTRACT

A preset application or an application determined by an electronic device based on a preset rule is automatically started when it is detected that an electronic device is attached onto a vehicle magnetic suction bracket. Therefore, the electronic device can automatically respond to an operation of attaching the electronic device onto the vehicle magnetic suction bracket by a user.

20 Claims, 15 Drawing Sheets

(56) References Cited

U.S. PATENT DOCUMENTS

| | | | |
|---|---|---|---|
| 9,292,045 B2* | 3/2016 | Shultz | G06F 1/1686 |
| 10,051,110 B2* | 8/2018 | Dave | G06Q 10/02 |
| 10,104,215 B2* | 10/2018 | Zhang | H04M 1/57 |
| 10,259,466 B2* | 4/2019 | Memani | B60W 40/09 |
| 10,481,698 B2* | 11/2019 | Park | G06F 3/017 |
| 2009/0284463 A1* | 11/2009 | Morimoto | G06F 1/1616 |
| | | | 345/156 |
| 2010/0069115 A1 | 3/2010 | Liu | |
| 2010/0095251 A1* | 4/2010 | Dunko | H04M 1/72572 |
| | | | 715/863 |
| 2010/0317418 A1 | 12/2010 | Zanetti | |
| 2011/0066363 A1 | 3/2011 | Kimishima | |
| 2011/0141006 A1 | 6/2011 | Rabu | |
| 2012/0169327 A1 | 7/2012 | Parco et al. | |
| 2013/0339720 A1 | 12/2013 | Levy et al. | |
| 2014/0268622 A1 | 9/2014 | Chao | |
| 2015/0341483 A1 | 11/2015 | Zou | |
| 2016/0021238 A1 | 1/2016 | Abramson et al. | |
| 2019/0272182 A1* | 9/2019 | Wang | G01R 33/00 |

FOREIGN PATENT DOCUMENTS

| | | |
|---|---|---|
| CN | 102224764 A | 10/2011 |
| CN | 104044516 A | 9/2014 |
| CN | 205510165 U | 8/2016 |
| CN | 109565529 A | 4/2019 |
| KR | 20030024008 A | 3/2003 |

OTHER PUBLICATIONS

Foreign Communication From a Counterpart Application, PCT Application No. PCT/CN2016/112192, English Translation of International Search Report dated Sep. 30, 2017, 2 pages.

Foreign Communication From a Counterpart Application, PCT Application No. PCT/CN2016/112192, English Translation of Written Opinion dated Sep. 30, 2017, 5 pages.

Machine Translation and Abstract of Korean Publication No. KR20030024008, Mar. 26, 2003, 9 pages.

Foreign Communication From a Counterpart Application, European Application No. 16925436.4, Extended European Search Report dated Oct. 18, 2019, 8 pages.

* cited by examiner

DEVICE, METHOD, AND GRAPHICAL USER INTERFACE FOR STARTING APPLICATION

CROSS-REFERENCE TO RELATED APPLICATIONS

This application is a U.S. National Stage of International Patent Application No. PCT/CN2016/112192 file on Dec. 26, 2016, which is hereby incorporated by reference in its entirety.

TECHNICAL FIELD

This specification relates to an electronic device having an accelerometer and a magnetometer, and includes but is not limited to an electronic device, a method, and a graphical user interface for starting an application.

BACKGROUND

Currently, most users owning an automobile mount a vehicle magnetic suction bracket (vehicle magnetic suction bracket) in the automobile. Before driving, a user attaches an electronic device (for example, a mobile phone) onto a vehicle magnetic suction bracket, so that the user uses an application (for example, a navigation application, a music application, a driving mode application, a radio application, or a speech assistant application) on the electronic device while driving. However, currently, after attaching the electronic device onto the vehicle magnetic suction bracket, the user further needs to manually unlock the electronic device, then search for the application, and manually start the application after finding the application. These processes bring great inconvenience to the user.

SUMMARY

Therefore, an electronic device is required to have an automatic and efficient method and user interface to respond to an operation of attaching the electronic device onto a vehicle magnetic suction bracket by a user. Such a method and a user interface may supplement or replace a conventional method that requires a user to manually start an application. Such a method and a user interface can respond automatically to a personalized requirement of a user more quickly, more efficiently, and more intelligently, helping the user to manually operate the electronic device with less time, and a more efficient human-computer interaction user interface is generated. For a battery-driven electronic device, such a method and a user interface can save power and extend an interval between two consecutive battery charging times.

Some embodiments of this specification provide the foregoing method and user interface by using a disclosed electronic device. In some embodiments, the electronic device is portable (for example, a notebook computer, a tablet computer, a handheld device, or a wearable device). In some embodiments, the electronic device has a touchpad. In some embodiments, the electronic device has a touch-sensitive display (also referred to as a "touchscreen", a "touchscreen display", or a "display having a touch-sensitive surface"). In some embodiments, the electronic device has a graphical user interface (GUI), one or more processors, a memory, and one or more modules, programs, or instruction sets stored in the memory to perform a plurality of functions. In some embodiments, a user mainly interacts with the GUI by using a finger contact and/or gesture on the touch-sensitive surface. In some embodiments, these functions may include image editing, drawing, presentation, word processing, web page creation, disk editing, spreadsheet making, game playing, call making and answering, videoconferencing, email sending and receiving, instant messaging, exercise support, digital photographing, digital video recording, web browsing, digital music playing, and/or digital video playing. Executable instructions for performing these functions may be included in a non-transitory computer-readable storage medium or another computer program product configured to be executed by one or more processors.

According to a first aspect, an electronic device is provided. The device includes: a display, one or more processors, an accelerometer, a magnetometer, a memory, a plurality of application programs, and one or more programs. The one or more programs are stored in the memory and configured to be executed by the one or more processors. The one or more programs include an instruction. The instruction is used to: obtain a first group of data detected by the accelerometer and/or a second group of data detected by the magnetometer; determine, on the basis that a part (or all) of data in the first group of data and/or a part (or all) of data in the second group of data meet/meets a preset condition, that the electronic device is attached onto a vehicle magnetic suction bracket; and start at least one application, where the at least one application is a preset application or an application determined by the electronic device based on a preset rule. Such a method and a user interface can respond automatically to a personalized requirement of a user more quickly, more efficiently, and more intelligently, helping the user to manually operate the electronic device with less time. It should be understood that, in some specific designs, it may be determined, based on only data detected by the accelerometer or the magnetometer, whether the electronic device is attached onto the vehicle magnetic suction bracket, which is less accurate than a result of determining based on data detected by both the accelerometer and the magnetometer.

In a first possible implementation of the first aspect, the instruction is further used to: the basis that a part or all of data in the first group of data and a part or all of data in the second group of data meet a preset condition includes: determining, based on at least the part or all of data in the first group of data, that one collision occurs on the electronic device; and determining, based on at least the part or all of data in the second group of data, that a strength of a magnetic field in which the electronic device is located within a preset length of time after the collision occurs on the electronic device is greater than a first threshold or a strength variation of the magnetic field is greater than a second threshold. This can respond more quickly and more intelligently to a personalized requirement of a user, reduce manual operations of the user, and save power.

In a second possible implementation of the first aspect, the instruction is further used to: after the basis that the part or all of data in the first group of data and the part or all of data in the second group of data meet the preset condition, determine, based on the part or all of data in the first group of data, that the electronic device is in a reading posture, where the reading posture indicates that the electronic device is not in the following state: a screen of the electronic device being in a horizontal state or the electronic device being upside-down. A step of determining a reading posture is added, so that a possibility of erroneous determining can be further reduced.

In a third possible implementation of the first aspect, the instruction is further used to: obtain a third group of data detected by the accelerometer and a fourth group of data detected by the magnetometer: determine, on the basis that a part or all of data in the third group of data and a part or all of data in the fourth group of data meet a preset condition, that the electronic device is detached from the vehicle magnetic suction bracket; and close the at least one started application. This can respond more quickly and more intelligently to a personalized requirement of a user, reduce manual operations of the user, and save power.

In a fourth possible implementation of the first aspect, the instruction is further used to: before the obtaining the first group of data detected by the accelerometer and the second group of data detected by the magnetometer, determine, based on at least one of a location of the electronic device or a motion status of the electronic device, that a probability that the electronic device is in an automobile is greater than a third threshold, where the motion status includes: being in a started automobile or a non-stationary state. In this way, the technical solution can be triggered only when it is determined that the electronic device is in an automobile, so that power can be further saved.

In a fifth possible implementation of the first aspect, the instruction is further used to: determine, based on at least one of the location of the electronic device or the motion status of the electronic device, that the probability that the electronic device is in an automobile is greater than the third threshold, and shorten a first period for obtaining data detected by the accelerometer and shorten a second period for obtaining data detected by the magnetometer, where the motion status includes: being in a started automobile or the non-stationary state. In this way, periods for obtaining data from the two sensors (the accelerometer and the magnetometer) can be adjusted when it is determined that the electronic device is in an automobile, so that power can be further saved.

In a sixth possible implementation of the first aspect, the instruction is further used to: determine, based on at least one of the location of the electronic device or the motion status of the electronic device, that a probability that the electronic device is in a running automobile is greater than a fourth threshold, and disable m applications in the electronic device; and determine, based on at least one of the location of the electronic device or the motion status of the electronic device, that a probability that the electronic device is in an automobile in a stopped state is greater than a fifth threshold, and disable n applications in the electronic device, where the motion status includes: being in a started automobile or the non-stationary state, m and n are integers not less than 1, and m is greater than n. In this way, an operation permission on an application is controlled, so that an operation of a user, such as making a call while driving, can be avoided, and driving safety of the user is further ensured.

In a seventh possible implementation of the first aspect, the instruction is further used to: before the starting at least one application, display an unlock user interface, and start the at least one application after a correct unlock instruction is received. In this way, a security coefficient of a mobile phone can be provided.

In an eighth possible implementation of the first aspect, the instruction is further used to: before the starting at least one application, determine a security coefficient of the at least one application, and directly start the at least one application when the security coefficient of the at least one application is higher than the fifth threshold, or when the security coefficient of the at least one application is not higher than the fifth threshold, display the unlock user interface, and start the at least one application after the correct unlock instruction is received. In this way, a security coefficient of a mobile phone can be provided.

According to a second aspect, an embodiment of the present invention provides a method, applied to an electronic device having an accelerometer and a magnetometer, where the method includes: obtaining a first group of data detected by the accelerometer and a second group of data detected by the magnetometer; determining, on the basis that a part or all of data in the first group of data and a part or all of data in the second group of data meet a preset condition, that the electronic device is attached onto a vehicle magnetic suction bracket; and starting at least one application, where the at least one application is a preset application or an application determined by the electronic device based on a preset rule.

In a first possible implementation of the second aspect, the method further includes: the basis that a part or all of data in the first group of data and a part or all of data in the second group of data meet a preset condition includes: determining, based on at least the part or all of data in the first group of data, that one collision occurs on the electronic device; and determining, based on at least the part or all of data in the second group of data, that a strength of a magnetic field in which the electronic device is located within a preset length of time after the collision occurs on the electronic device is greater than a first threshold or a strength variation of the magnetic field is greater than a second threshold. This can respond more quickly and more intelligently to a personalized requirement of a user, reduce manual operations of the user, and save power.

In a second possible implementation of the second aspect, the method further includes: after the basis that the part or all of data in the first group of data and the part or all of data in the second group of data meet the preset condition, determining, based on the part or all of data in the first group of data, that the electronic device is in a reading posture, where the reading posture indicates that the electronic device is not in the following state: a screen of the electronic device being in a horizontal state or the electronic device being upside-down. Such a method and a user interface can respond automatically to a personalized requirement of a user more quickly, more efficiently, and more intelligently, helping the user to manually operate the electronic device with less time. It should be understood that, in some specific designs, it may be determined, based on only data detected by the accelerometer or the magnetometer, whether the electronic device is attached onto the vehicle magnetic suction bracket, which is less accurate than a result of determining based on data detected by both the accelerometer and the magnetometer.

In a third possible implementation of the second aspect, the method further includes: obtaining a third group of data detected by the accelerometer and a fourth group of data detected by the magnetometer; determining, on the basis that a part or all of data in the third group of data and a part or all of data in the fourth group of data meet a preset condition, that the electronic device is detached from the vehicle magnetic suction bracket: and closing the at least one started application. A step of determining a reading posture is added, so that a possibility of erroneous determining can be further reduced.

In a fourth possible implementation of the second aspect, the method further includes: before the obtaining a first group of data detected by the accelerometer and a second group of data detected by the magnetometer, determining, based on at least one of a location of the electronic device or a motion status of the electronic device, that a probability that the electronic device is in an automobile is greater than a third threshold, where the motion status includes: being in a started automobile or a non-stationary state. In this way, the technical solution can be triggered only when it is determined that the electronic device is in an automobile, so that power can be further saved.

In a fifth possible implementation of the second aspect, the method further includes: determining, based on at least one of the location of the electronic device or the motion status of the electronic device, that the probability that the electronic device is in an automobile is greater than the third threshold, and shortening a first period for obtaining data detected by the accelerometer and shortening a second period for obtaining data detected by the magnetometer, where the motion status includes: being in a started automobile or the non-stationary state. In this way, periods for obtaining data from the two sensors (the accelerometer and the magnetometer) can be adjusted when it is determined that the electronic device is in an automobile, so that power can be further saved.

In a sixth possible implementation of the second aspect, the method further includes: determining, based on at least one of the location of the electronic device or the motion status of the electronic device, that a probability that the electronic device is in a running automobile is greater than a fourth threshold, and disabling m applications in the electronic device; and determining, based on at least one of the location of the electronic device or the motion status of the electronic device, that a probability that the electronic device is in an automobile in a stopped state is greater than a fifth threshold, and disabling n applications in the electronic device, where the motion status includes: being in a started automobile or the non-stationary state. In this way, an operation permission on an application is controlled, so that an operation of a user, such as making a call while driving, can be avoided, and driving safety of the user is further ensured.

In a seventh possible implementation of the second aspect, the method further includes: before the starting at least one application, displaying an unlock user interface, and starting the at least one application after a correct unlock instruction is received. In this way, a security coefficient of a mobile phone can be provided.

In the seventh possible implementation of the second aspect, the method further includes: before the starting at least one application, determining a security coefficient of the at least one application, and directly starting the at least one application when the security coefficient of the at least one application is higher than the fifth threshold, or when the security coefficient of the at least one application is not higher than the fifth threshold, displaying the unlock user interface, and starting the at least one application after the correct unlock instruction is received. In this way, a security coefficient of a mobile phone can be provided.

According to another aspect, an embodiment of the present invention provides an electronic device, including: a display, an accelerometer, a magnetometer, one or more processors, a memory, a plurality of application programs, and one or more programs. The one or more programs are stored in the memory and configured to be executed by the one or more processors. The one or more programs include an instruction for performing the method according to the second aspect.

According to another aspect, an embodiment of the present invention provides a computer-readable storage medium for storing one or more programs. The one or more programs include an instruction, and when the instruction is executed by an electronic device having a display and a plurality of application programs, the electronic device performs the method according to the second aspect.

According to another aspect, an embodiment of the present invention provides a graphical user interface on an electronic device. The electronic device includes a display, an accelerometer, a magnetometer, a memory, a plurality of application programs, and one or more processors configured to execute one or more programs stored in the memory. The graphical user interface includes a user interface displayed in the method according to the second aspect. The display includes a touch-sensitive surface and a display screen.

According to another aspect, an embodiment of the present invention provides an electronic device, including: a display, where the display includes a touch-sensitive surface and a display screen; a plurality of application programs; and an apparatus configured to perform the method according to the second aspect.

According to another aspect, an embodiment of the present invention provides an information processing apparatus used in an electronic device. The electronic device includes a display and a plurality of application programs. The information processing apparatus includes: an apparatus configured to perform the method according to the second aspect. The display includes a touch-sensitive surface and a display screen.

Based on the foregoing technical solutions, the electronic device can have the automatic and efficient method and user interface to respond to the operation of attaching the electronic device onto the vehicle magnetic suction bracket by the user. For a battery-driven device, such a method and a user interface can save power and extend an interval between two consecutive battery charging times.

BRIEF DESCRIPTION OF DRAWINGS

For a better understanding of the foregoing embodiments of the present invention and additional embodiments of the present invention, reference should be made to the following embodiment descriptions in combination with the following accompanying drawings. In the accompanying drawings, a same reference numeral in all the accompanying drawings denotes a corresponding component.

DESCRIPTION OF EMBODIMENTS

Usually, after entering an automobile, a user attaches an electronic device (for example, a mobile phone) onto a vehicle magnetic suction bracket, then manually unlocks the mobile phone, searches for an application, and then starts the application. Such an application starting process requires a plurality of operations, a large amount of power is consumed, and user experience is poor.

With the help of embodiments described below, without needing to perform any operation, a user can start a preset application or an application selected based on a use habit of the user, thereby reducing manual operations of the user, and saving power.

In some embodiments, when a user attaches a mobile phone onto a vehicle magnetic suction bracket, the mobile phone determines, based on data detected by an accelerometer and/or a magnetometer and a preset condition, that the mobile phone is attached onto the vehicle magnetic suction bracket, and the mobile phone starts a preset application (for example, navigation software or music player software). Alternatively, the mobile phone starts an application selected based on a use habit of the user. Alternatively, the mobile phone starts a recommendation menu, the recommendation menu displays an application selected based on a use habit of the user, and when the user manually selects a specific application or selects a specific application through voice, the application is started. It should be noted that, in a possible design, for the sake of security, before the application is automatically started, a security verification step needs to be added. For example, a user interface of the mobile phone displays an unlock pattern, or the mobile phone provides a voice prompt for voiceprint verification, facial recognition, fingerprint verification, or the like. In another possible design, no security verification step needs to be added before the application is started, but the mobile phone can automatically start only some applications (for example, music player software, radio software, or navigation software) having a relatively high security coefficient, and another application related to privacy or a financial transaction can be started only after the mobile phone is unlocked.

Figure 2:
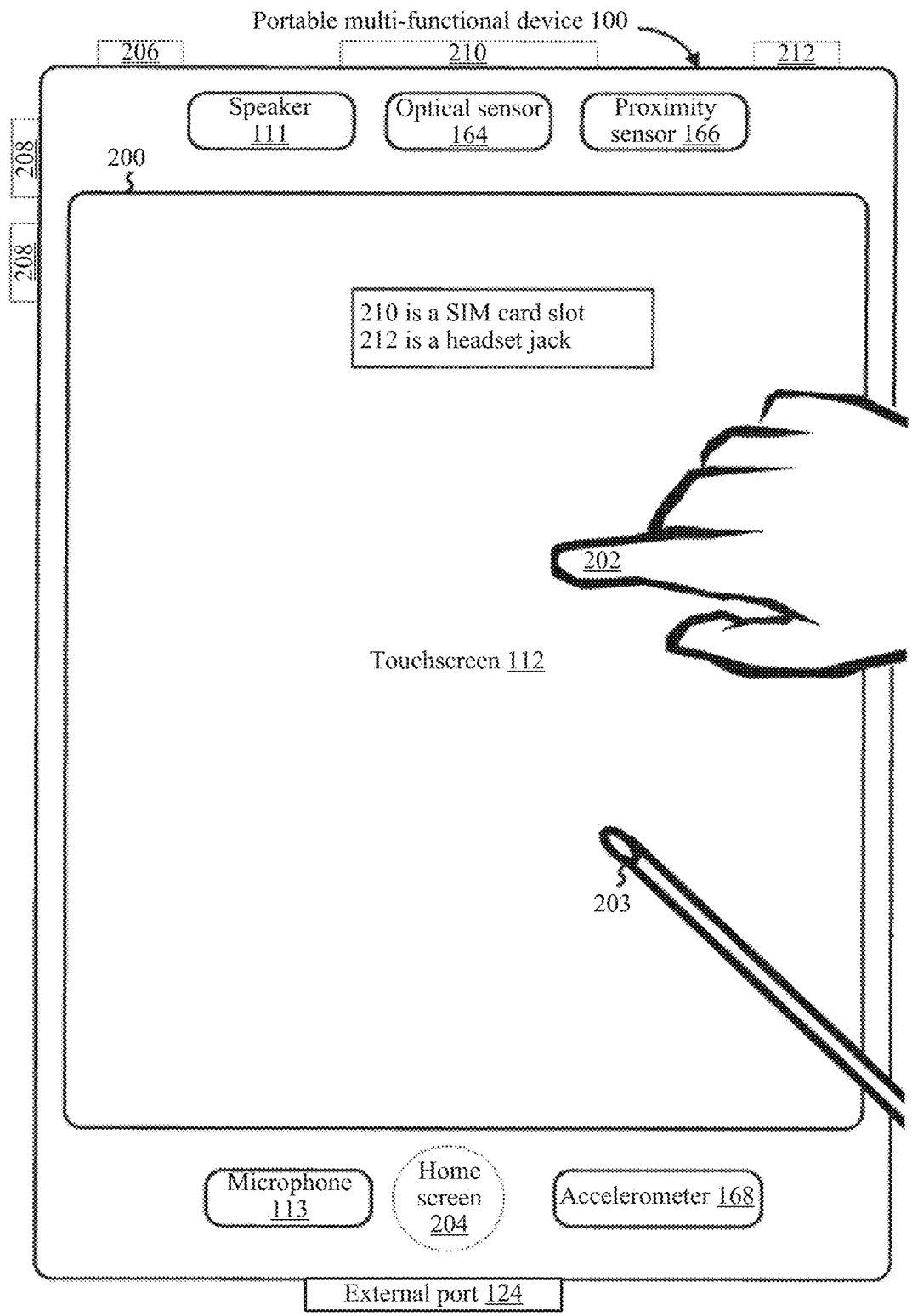
FIG. 2 shows an electronic device having a touchscreen according to some embodiments.
Figure 3:
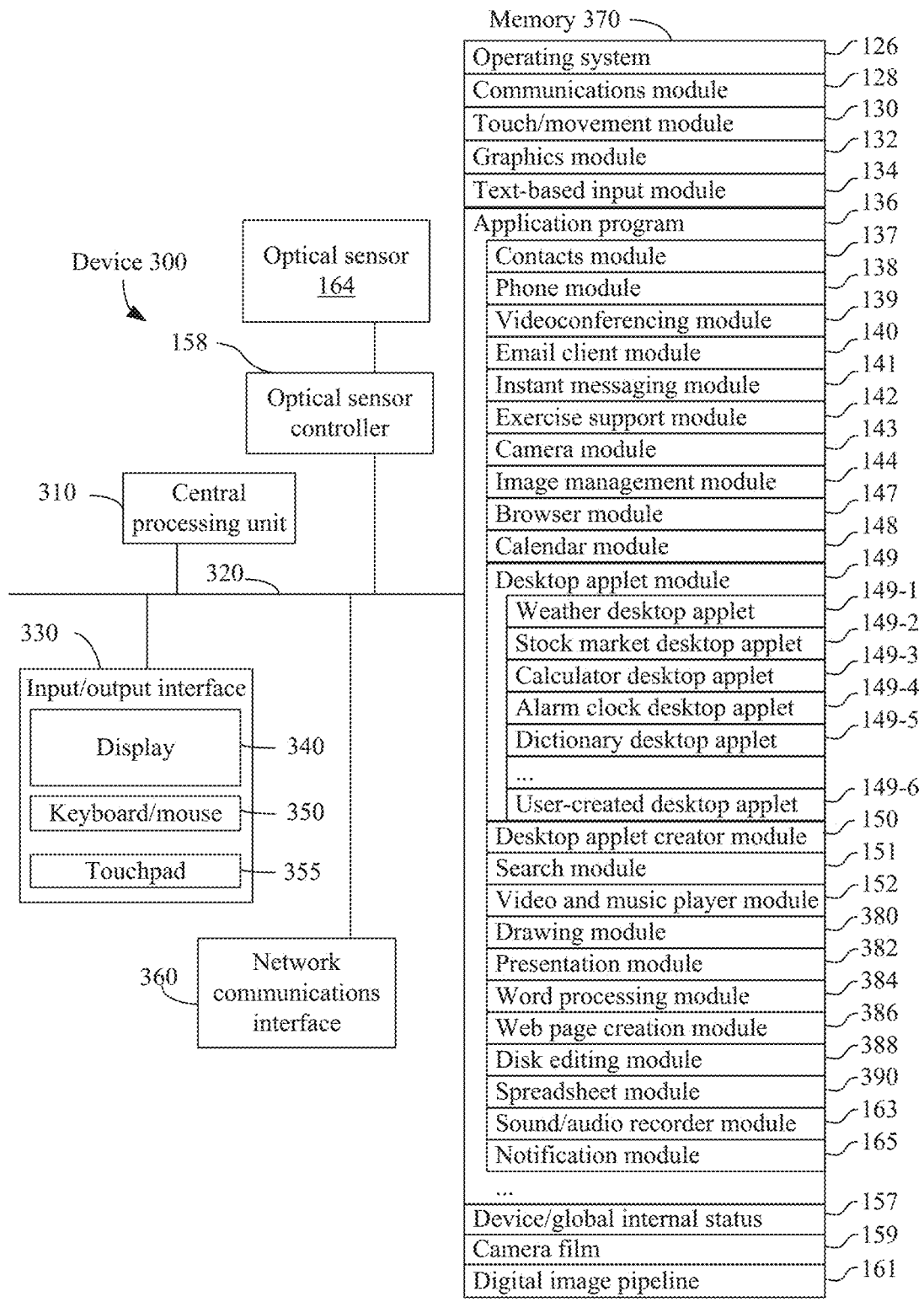
FIG. 3 is a block diagram of an example electronic device having a display and a touch-sensitive surface according to some embodiments.
Figure 4:
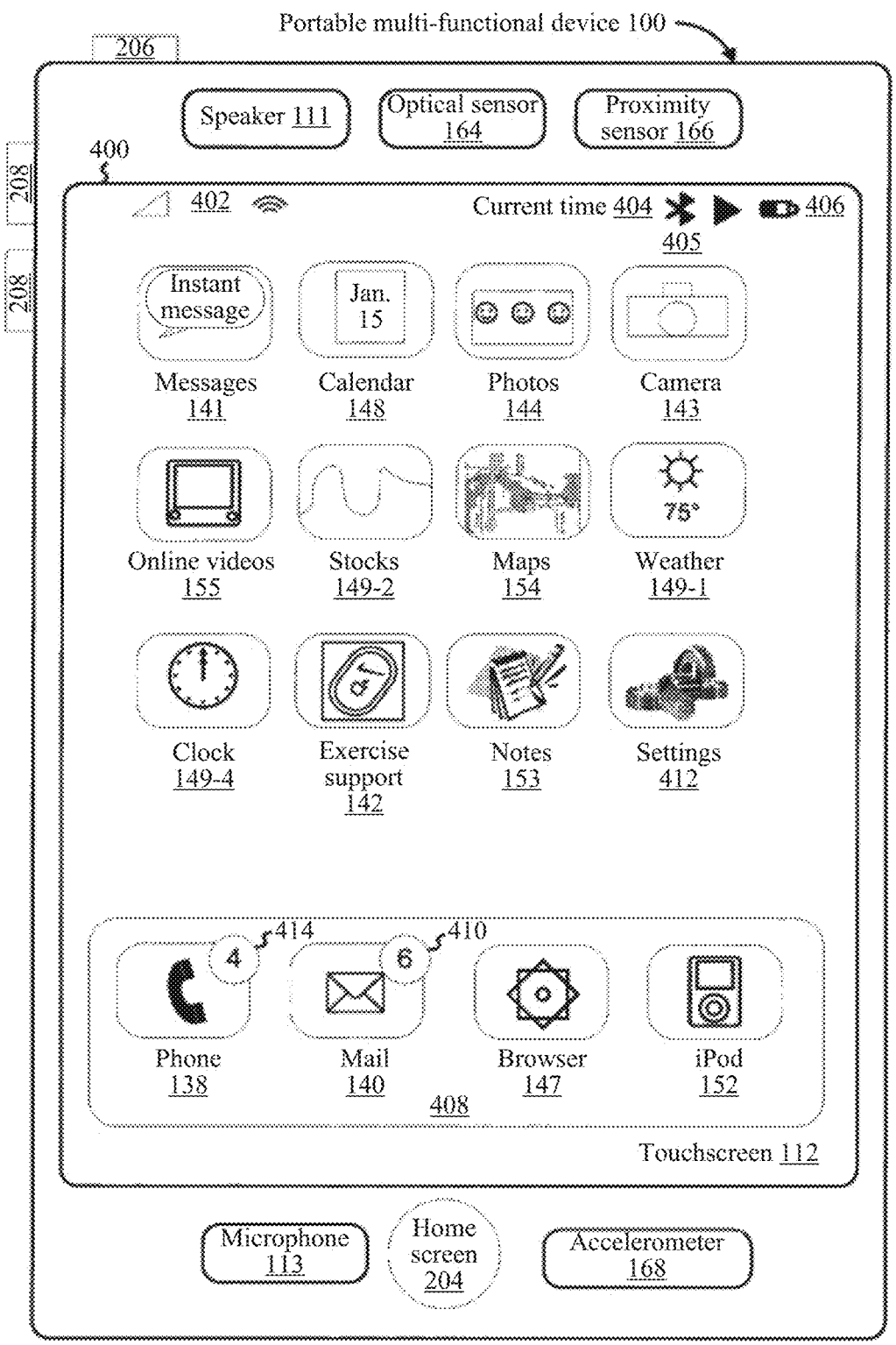
FIG. 4 shows an example user interface used for an application program menu on an electronic device according to some embodiments.
Figure 5A:
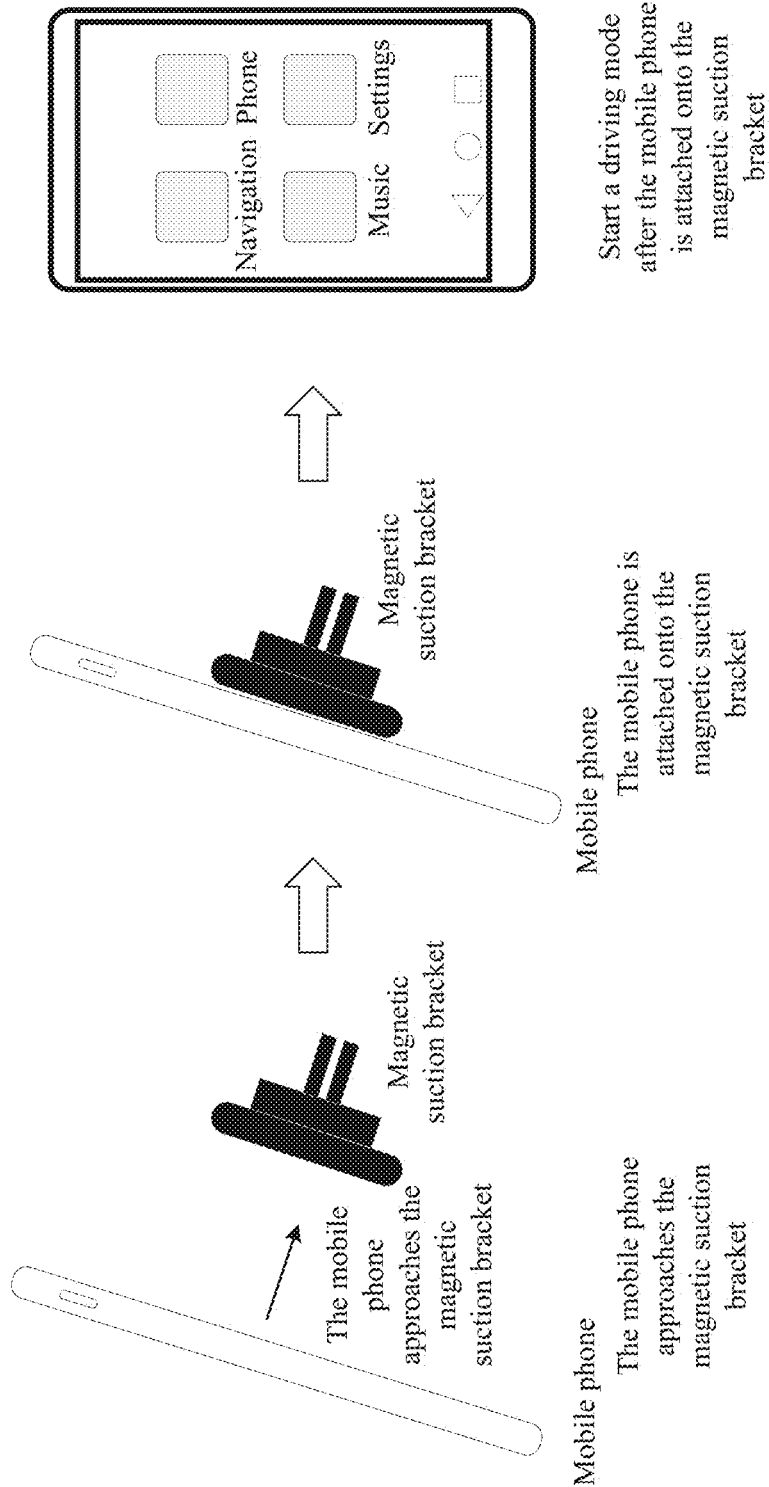
FIG. 5a and FIG. 5b show example user interfaces for starting an application according to some embodiments.
Figure 5B:
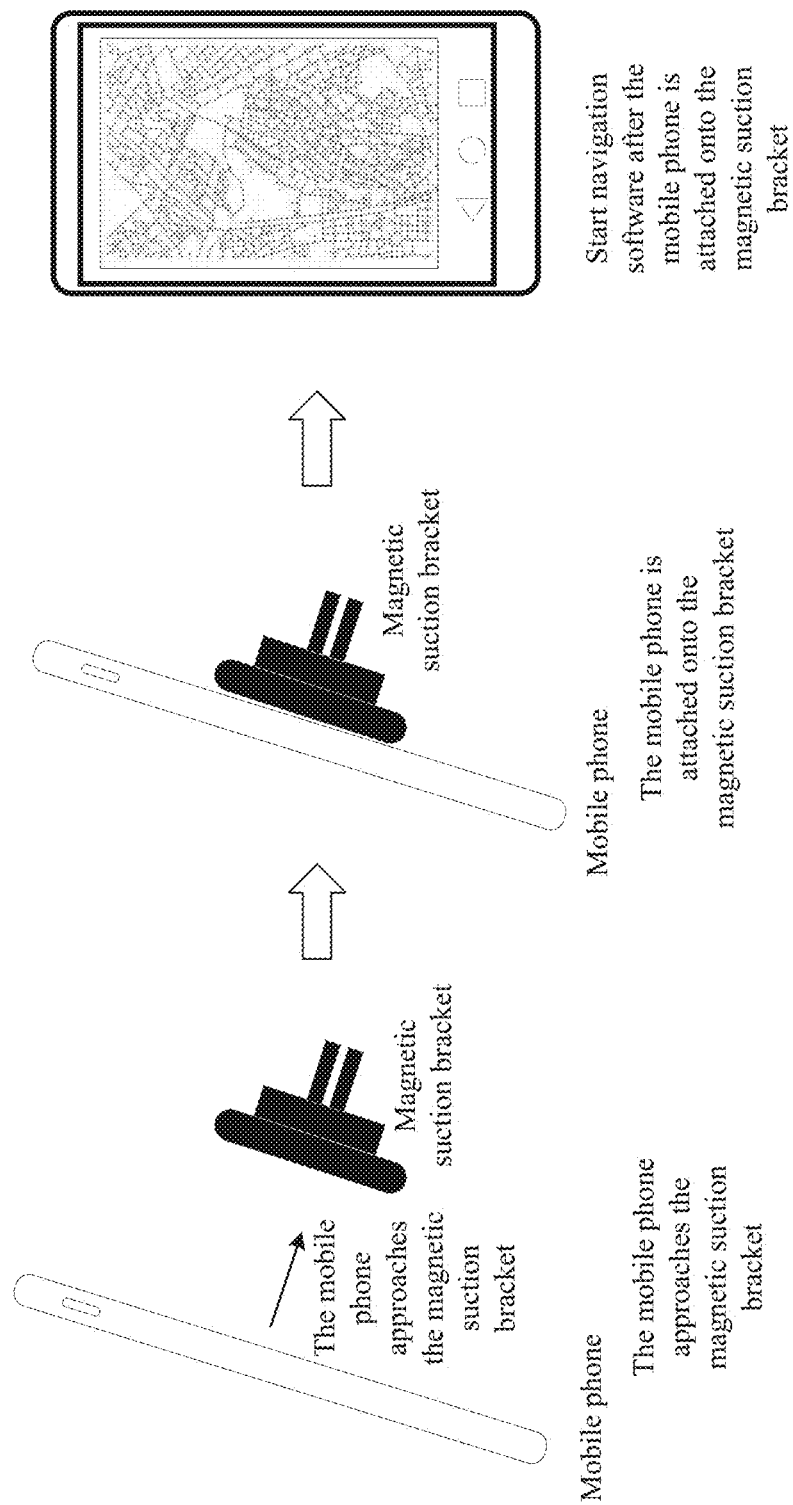

The following describes an example device with reference to FIG. 1A and FIG. 1B, FIG. 2, and FIG. 3. FIG. 4, FIG. 5a, and FIG. 5b show example user interfaces used for a mobile application interface element.

Example Device

Now, the embodiments are referred to in detail, and examples of the embodiments are shown in the accompanying drawings. Many specific details are provided in the following detailed description, to provide a full understanding of the present invention. However, it is obvious to a person skilled in the art that the present invention may be practiced without these specific details. In other cases, well-known methods, processes, components, circuits, and networks are not described in detail, so that aspects of the embodiments are easy to understand.

It should be further understood that, although the terms such as "first", "second", "third", "fourth", and "fifth" may be used to describe various elements in this specification, the elements should not be limited by the terms. These terms are merely used to distinguish one element from another element. For example, a first threshold may be named a second threshold, and similarly, the second threshold may be named the first threshold, without departing from the scope of the present invention. The first threshold and the second threshold are both thresholds, and may have a same value, or may have different values.

The terms used in the description of the present invention in this specification are merely for the purpose of describing specific embodiments, and are not intended to limit the present invention. As used in this specification and the appended claims of the present invention, the terms "one", "a(n)", and "this" of singular forms are also intended to cover plural forms, unless otherwise expressly specified in the context. It should be further understood that, the term "and/or" used in this specification indicates and includes any or all possible combinations of one or more items in associated listed items. It should be further understood that, the term "include" and/or "contain" used in this specification means presence of the described features, integers, steps, operations, elements, and/or components, without excluding presence or addition of one or more other features, integers, steps, operations, elements, components, and/or their combinations.

Based on the context, as used in this specification, the term "if" may be interpreted as a meaning of "when" or "after" or "in response to determining that" or "in response to detecting that". Similarly, based on the context, the phrase "if it is determined that" or "if (a stated condition or event) is detected" may be interpreted as a meaning of "when it is determined that" or "in response to determining that" or "when (a stated condition or event) is detected" or "in response to that (a stated condition or event) is detected".

An electronic device, a user interface applied to such a device, and an embodiment of an associated process in which such a device is used are described. In some embodiments, the device is a portable communications device, such as a mobile phone, that further includes another function such as a personal digital assistant and/or music player function. An example embodiment of the electronic device includes, but is not limited to, an electronic device using iOS®, Android®, Microsoft®, or another operating system. Another electronic device such as a laptop computer or a tablet computer that has a touch-sensitive surface (for example, a touchscreen display and/or a touchpad) may also be used. It should be further understood that, in some embodiments, the device is not a portable communications device, but a desktop computer that has a touch-sensitive surface (for example, a touchscreen display and/or a touchpad).

An electronic device including a display and a touch-sensitive surface is described in the following discussion. However, it should be understood that, the electronic device may include one or more other physical user interface devices, such as a physical keyboard, a mouse, and/or a joystick.

The device usually supports a plurality of application programs, such as one or more of the following: a drawing application program, a presentation application program, a word processing application program, a web page creation application program, a disk editing application program, a spreadsheet application program, a game application program, a phone application program, a videoconferencing application program, an email application program, an instant messaging application program, an exercise support application program, a photograph management application program, a digital camera application program, a digital video camera application program, a web browsing application program, a digital music player application program, and/or a digital video player application program.

Various application programs that can be executed on the device may use at least one common physical user interface device, such as a touch-sensitive surface. One or more functions of the touch-sensitive surface and corresponding information displayed on the device may be adjusted and/or changed from an application program to a next application program, and/or may be adjusted and/or changed in a corresponding application program. In this way, a common physical architecture (for example, the touch-sensitive surface) of the device may support various application programs by using a user interface that is intuitive and clear to a user.

Figure 1A:
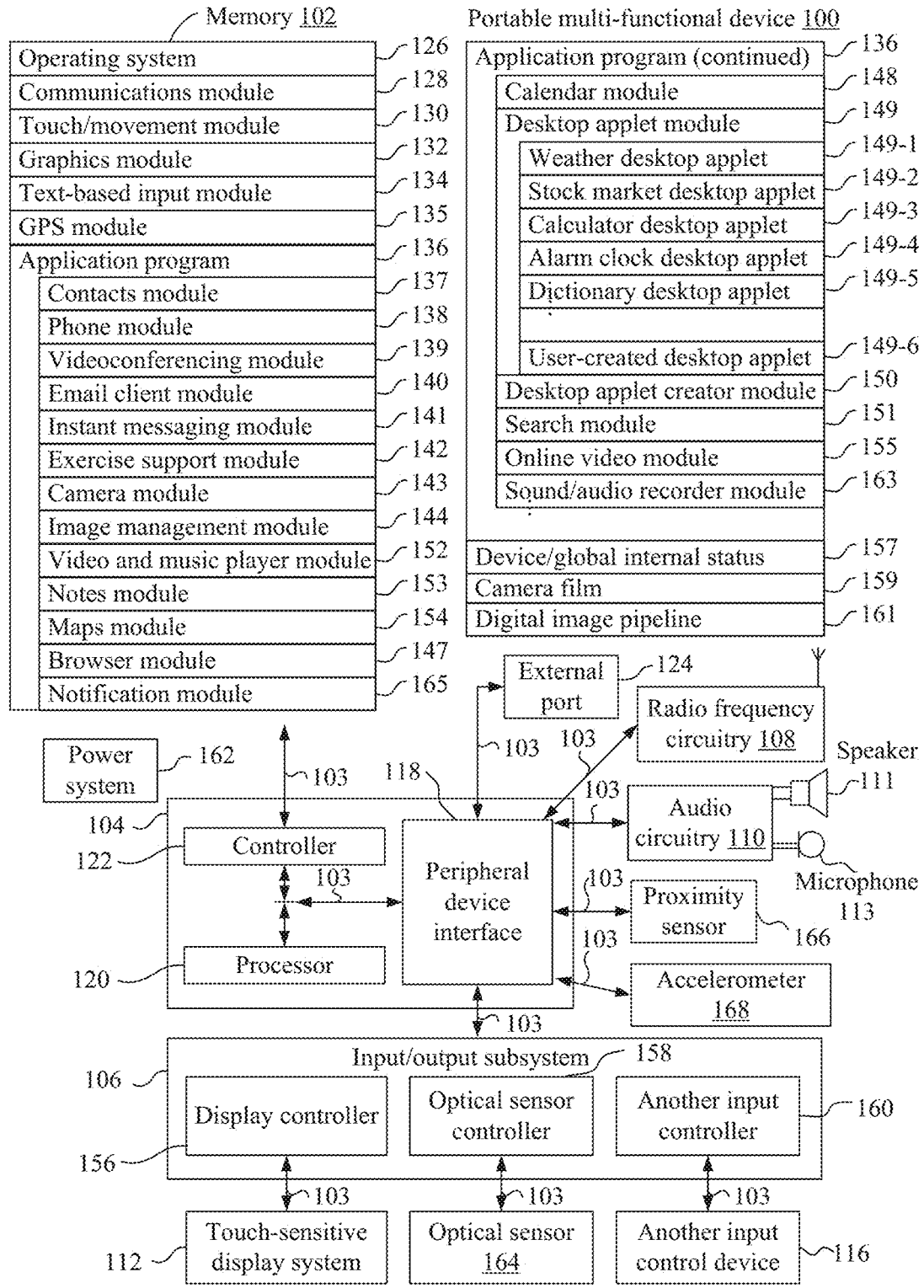
FIG. 1A is a block diagram of an electronic device having a touch-sensitive display according to some embodiments.

Now, an embodiment of a portable device having a touch-sensitive display is described. FIG. 1A is a block diagram of an electronic device 100 having a touch-sensitive display 112 according to some embodiments. The touch-sensitive display 112 sometimes is referred to as a "touchscreen" for convenience, and may also be referred to as a touch-sensitive display system, or may be referred to as a display system having a touch-sensitive surface (touch-sensitive surface) and a display screen (display). The device 100 may include a memory 102 (which may include one or more computer-readable storage media), a memory controller 122, one or more processing units (CPU) 120, a peripheral device interface 118, an RF circuitry 108, an audio circuitry 110, a speaker 111, a microphone 113, an input/output (I/O) subsystem 106, another input control device 116, and an external port 124. The device 100 may include one or more optical sensors 164. These components may communicate with each other by using one or more communications buses or signal cables 103.

It should be understood that, the device 100 is merely an example of an electronic device, and the device 100 may have more or fewer components than those shown in the figure, or two or more components may be combined, or these components may be differently configured or arranged. Various components shown in FIG. 1A may be implemented by hardware, software, or a combination of software and hardware, including one or more signal processing and/or application-specific integrated circuits.

The memory 102 may include a high-speed random-access memory, and may further include a non-volatile memory, such as one or more magnetic disk storage devices, flash memory devices, or other non-volatile solid-state storage devices. Access to the memory 102 by another component (such as the CPU 120 and the peripheral device interface 118) of the device 100 may be controlled by the memory controller 122.

The peripheral device interface 118 may be configured to couple an input/output peripheral device of the device to the CPU 120 and the memory 102. The one or more processors 120 run or execute various software programs and/or instruction sets stored in the memory 102, to perform various functions of the device 100 and process data. In some embodiments, the one or more processors 120 include an image signal processor and a dual-core or multi-core processor.

In some embodiments, the peripheral device interface 118, the CPU 120, and the memory controller 122 may be implemented on a single chip, such as a chip 104. In some other embodiments, they may be implemented on independent chips.

The RF (radio frequency) circuitry 108 receives and sends an RF signal, which is also referred to as an electromagnetic signal. The RF circuitry 108 converts an electrical signal into an electromagnetic signal or converts an electromagnetic signal into an electrical signal, and communicates with a communications network and another communications device by using the electromagnetic signal. The RF circuitry 108 may include a well-known circuitry for performing these functions, including but not limited to, an antenna system, an RF transceiver, one or more amplifiers, a tuner, one or more oscillators, a digital signal processor, a codec chip set, a subscriber identity module (SIM) card, a memory, or the like. The RF circuitry 108 may communicate with a network and another device through wireless communications. The network is, for example, the Internet (also referred to as the World Wide Web (WWW)), an intranet, and/or a wireless network (for example, a cellular phone network, a wireless local area network (LAN), and/or a metropolitan area network (MAN)). The wireless communications may use any type in a plurality of communications standards, protocols, and technologies, including but not limited to, the Global System for Mobile Communications (GSM), Enhanced Data GSM Environment (EDGE), High Speed Downlink Packet Access (HSDPA), High Speed Uplink Packet Access (HSUPA), Wideband Code Division Multiple Access (WCDMA), Code Division Multiple Access (CDMA), Time Division Multiple Access (TDMA), Bluetooth, Wireless Fidelity (Wi-Fi) (for example, IEEE 802.11a, IEEE 802.11b, IEEE 802.11g, and; or IEEE 802.11n), the Voice over Internet Protocol (VoIP), Wi-MAX, an email protocol (for example, the Internet Message Access Protocol (IMAP) and/or the Post Office Protocol (POP)), instant messaging (for example, the Extensible Messaging and Presence Protocol (XMPP), the Session Initiation Protocol for Instant Messaging and Presence Leveraging Extensions (SIMPLE), an Instant Messaging and Presence Service (IMPS)), and/or a Short Message Service (SMS), or any other proper communications protocol, including a communications protocol that has not yet been developed by the filing date of this document.

The audio circuitry 110, the speaker 111, and the microphone 113 provide an audio interface between a user and the device 100. The audio circuitry 110 receives audio data from the peripheral device interface 118, converts the audio data into an electrical signal, and transmits the electrical signal to the speaker 111. The speaker 111 converts the electrical signal into a human-audible sound wave. The audio circuitry 110 further receives an electrical signal obtained by the microphone 113 through conversion based on a sound wave.

The audio circuitry 110 converts the electrical signal into audio data, and transmits the audio data to the peripheral device interface 118 for processing. The peripheral device interface 118 may retrieve audio data from and/or transmit audio data to the memory 102 and/or the RF circuitry 108. In some embodiments, the audio circuitry 110 further includes a headset jack (for example, 212 in FIG. 2). The headset jack provides an interface between the audio circuitry 110 and a removable audio input/output peripheral device. The peripheral device is, for example, an earphone only for outputting or a headset for both outputting (for example, a single-earpiece or two-earpiece earphone) and inputting (for example, a microphone).

The I/O subsystem 106 couples the input/output peripheral device, such as the touchscreen 112 and the another input control device 116, on the device 100 to the peripheral device interface 118. The I/O subsystem 106 may include a display controller 156 and one or more input controllers 160 for the another input control device. The one or more input controllers 160 receive an electrical signal from or send an electrical signal to the another input control device 116. The another input control device 116 may include a physical button (for example, a push button or a rocker button), a dial pad, a slide switch, a joystick, a click wheel, or the like. In some optional embodiments, the input controller 160 may be coupled (or not coupled) to any one of the following: a keyboard, an infrared port, a USB port, and a pointer device such as a mouse. The one or more buttons (for example, 208 in FIG. 2) may include an up/down button for controlling volume of the speaker 111 and/or the microphone 113. The one or more buttons may include a push button (for example, 206 in FIG. 2).

The touch-sensitive display 112 provides an input interface and an output interface between the device and the user. The display controller 156 receives an electrical signal from and/or sends an electrical signal to the touchscreen 112. The touchscreen 112 displays a visual output to the user. The visual output may include a graphic, a text, an icon, a video, or any combination thereof (collectively referred to as "graphics"). In some embodiments, some visual outputs or all visual outputs may correspond to a user interface object.

The touchscreen 112 has a touch-sensitive surface that receives an input from the user based on a touch and/or tactile contact, and a sensor or a sensor group. The touchscreen 112 and the display controller 156 (together with any associated module and/or instruction set in the memory 102) detect a contact (and any movement or release of the contact) on the touchscreen 112, and convert the detected contact into interaction with a user interface object (for example, one or more softkeys, icons, web pages, or images) displayed on the touchscreen 112. In an example embodiment, a point of contact between the touchscreen 112 and the user corresponds to a finger of the user.

The touchscreen 112 may use an LCD (liquid crystal display) technology, an LPD (light-emitting polymer display) technology, or an LED (light-emitting diode) technology, although another display technology may be used in another embodiment. The touchscreen 112 and the display controller 156 may detect a contact and any movement or release of the contact by using any one of a plurality of touch sensing technologies currently known or developed in the future and another proximity sensor array or another element for determining one or more points of contact with the touchscreen 112. The plurality of touch sensing technologies include, but are not limited to, capacitive, resistive, infrared, and surface acoustic wave technologies. In an example embodiment, a projected mutual capacitive sensing technology is used.

The touchscreen 112 may have video resolution of more than 100 dpi. In some embodiments, the touchscreen may have video resolution of approximately 160 dpi. The user may touch the touchscreen 112 by using any proper object or accessory such as a stylus or a finger. In some embodiments, the user interface is mainly designed to work with a finger-based contact and gesture, which may have lower precision than stylus-based input because a finger requires a larger contact area on the touchscreen. In some embodiments, the device translates a finger-based rough input into a precise pointer/cursor location or command, to perform an action expected by the user.

In some embodiments, in addition to the touchscreen, the device 100 may include a touchpad (not shown) for activating or deactivating a specific function. In some embodiments, the touchpad is a touch-sensitive area of the device that, unlike the touchscreen, does not display a visual output. The touchpad may be a touch-sensitive surface that is separate from the touchscreen 112, or an extended part of a touch-sensitive surface formed by the touchscreen.

The device 100 further includes a power system 162 for supplying power to various components. The power system 162 may include a power management system, one or more power supplies (for example, a battery or an alternating current (AC)), a recharging system, a power failure detection circuit, a power converter or inverter, a power status indicator (for example, a light-emitting diode (LED)), and any other component associated with generation, management, and distribution of power in the portable device.

The device 100 may further include one or more optical sensors 164. FIG. 1A shows an optical sensor coupled to an optical sensor controller 158 in the I/O subsystem 106. The optical sensor 164 may include a charge coupled device (CCD) or a complementary metal oxide semiconductor (CMOS) phototransistor. The optical sensor 164 receives light projected through one or more lenses from an environment, and converts the light into data representing an image. The optical sensor 164 can capture a static image or a video in combination with an imaging module 143 (also referred to as a camera module). In some embodiments, one or more optical sensors are located at the rear of the device 100, opposite to the touchscreen display 112 at the front of the device, so that the touchscreen display may be used as a viewfinder for static image and/or video image acquisition. In some embodiments, one or more other optical sensors are located at the front of the device, so that when a user watches another video conference participant on the touchscreen display, an image of the user can be obtained for videoconferencing.

The device 100 may further include one or more proximity sensors 166. FIG. 1A shows the proximity sensor 166 coupled to the peripheral device interface 118. Alternatively, the proximity sensor 166 may be coupled to the input controller 160 in the I/O subsystem 106. In some embodiments, the proximity sensor turns off and disables the touchscreen 112 when the electronic device is placed near an ear of a user (for example, when the user is making a phone call).

The device 100 may further include one or more accelerometers 168. FIG. 1A shows the accelerometer 168 coupled to the peripheral device interface 118. Alternatively, the accelerometer 168 may be coupled to the input controller 160 in the I/O subsystem 106. In some embodiments, information is displayed on the touchscreen display in a portrait view or a landscape view based on analysis of data received from the one or more accelerometers. Optionally, in addition to the accelerometer 168, the device 100 further includes a magnetometer (not shown) and a GPS (or GLONASS or BeiDou or another global navigation system) receiver (not shown) for obtaining location and orientation (for example, portrait or landscape) information of the device 100.

In some embodiments, software components stored in the memory 102 include an operating system 126, a communications module (or an instruction set) 128, a touch/movement module (or an instruction set) 130, a graphics module (or instruction set) 132, a text-based input module (or an instruction set) 134, a global positioning system (GPS) module (or an instruction set) 135, and an application program (or an instruction set) 136. In addition, in some embodiments, the memory 102 stores a device/global internal status 157, as shown in FIG. 1A and FIG. 3. The device/global internal status 157 includes one or more of the following: an active application program status for indicating which application program (if any) is currently active; a display status for indicating an application program, a view, or other information occupying areas of the touchscreen display 112; a sensor status, including information obtained from sensors of the device and the input control device 116; and location information of the device and location information of a posture of the device.

The operating system 126 (for example, Darwin, RTXC, LINUX, UNIX. OS X, WINDOWS, ANDROID, or an embedded operating system (such as VxWorks)) includes various software components and/or drivers for controlling and managing general system tasks (for example, memory management, storage device control, or power management), and facilitates communication between various hardware components and software components. In addition, in some embodiments, the memory 102 stores a digital camera film 159 and a digital image pipeline 161.

The communications module 128 facilitates communication with another device using one or more external ports 124, and further includes various software components for processing data received by the RF circuitry 108 and/or the external port 124. The external port 124 (for example, a universal serial bus (USB) or a live line) is suitable to be directly coupled to another device or indirectly coupled through a network (for example, the Internet or a wireless LAN) to another device. In some embodiments, the external port is a multi-pin (for example, 30-pin) connector that is the same as or similar to and/or compatible with a 30-pin connector used on an iPod (a trademark of Apple Inc.) device.

The touch/movement module 130 may detect a contact with the touchscreen 112 (in combination with the display controller 156) and another touch-sensitive device (for example, a touchpad or a physical click wheel). The touch/movement module 130 includes a plurality of software components for performing various operations related to contact detection, for example, determining whether a contact occurs (for example, detecting a finger press event), determining whether the contact moves and tracking the movement on the entire touch-sensitive surface (for example, detecting a one-finger or multi-finger drag event), and determining whether the contact is released (for example, detecting a finger lift event or release of the contact). The touch/movement module 130 receives contact data from the touch-sensitive surface. Determining a movement of a point of contact may include determining a speed (a magnitude), a velocity (a magnitude and a direction), and/or acceleration (a variation of the magnitude and/or the direction) of the point of contact. The movement of the point of contact is indicated by a series of contact data. These operations may be applied to a single-point contact (for example, a one-finger contact) or a multi-point contact (for example, a "multi-touch"/multi-finger contact). In some embodiments, the touch/movement module 130 and the display controller 156 detect a contact on the touchpad.

The touch/movement module 130 may detect a gesture input of the user. Different gestures on the touch-sensitive surface have different contact patterns. Therefore, a gesture may be detected by detecting a specific contact pattern. For example, detecting a single-finger tap gesture includes detecting a finger press event and then detecting a finger lift (leave) event at a same location (or a basically same location) (for example, at an icon location) as that of the finger press event. For another example, detecting a finger swipe gesture on the touch-sensitive surface includes detecting a finger press event, then detecting one-finger or multi-finger drag event, and subsequently detecting a finger lift (leave) event.

The graphics module 132 includes a plurality of known software components for rendering and displaying a graphic on the touchscreen 112 or another display, and includes a component for changing an intensity of the displayed graphic. As used in this specification, the term "graphic" includes any object that can be displayed to the user, non-restrictively including a text, a web page, an icon (such as a user interface object including a softkey), a digital image, a video, an animation, or the like without limitation.

In some embodiments, the graphics module 132 stores to-be-used data to represent a graphic. Each graphic may be allocated a corresponding code. The graphics module 132 receives, from an application program or the like, one or more codes that specify a graphic to be displayed, and when necessary, also receives coordinate data and other graphic attribute data, and then generates screen image data for outputting to the display controller 156.

The text-based input module 134, which may be used as a component of the graphics module 132, provides a soft keyboard for entering a text in various application programs (for example, a contacts 137, an email client 140, an instant messaging 141, a browser 147, and any other application program requiring a text-based input).

The GPS module 135 determines a location of the device and provides the information for use in various application programs (for example, provides the information to a phone module 138 for location-based dialing, to the camera module 143 as picture/video metadata, or to an application program, such as a weather desktop applet, a local yellow pages desktop applet, or a map/navigation desktop applet, providing a location-based service).

The application program 136 may include the following modules (or instruction sets) or a subgroup or superset thereof:

the contacts module 137 (sometimes also referred to as an address book or a contacts list);
    the phone module 138;
    a videoconferencing module 139;
    the email client module 140;
    the instant messaging (IM) module 141;
    an exercise support module 142;
    the camera module 143 for a static image and/or a video image;
    an image management module 144;
    the browser module 147;
    a calendar module 148;

a desktop applet module 149, which may include one or more of the following: a weather desktop applet 149-1, a stock market desktop applet 149-2, a calculator desktop applet 149-3, an alarm clock desktop applet 149-4, a dictionary desktop applet 149-5, and another desktop applet obtained by the user, and a user-created desktop applet 149-6;

a desktop applet creator module 150 for generating the user-created desktop applet 149-6;

a search module 151;

a video and music player module 152, which may include a video player module and a music player module;

a notes module 153;

a maps module 154;

an online video module 155;

a sound/audio recorder module 163; and/or a notification module 165.

Other examples of the application program 136 that may be stored in the memory 102 include another word processing application program, another image editing application program, a drawing application program, a presentation application program, a JAVA-started application program, encryption, digital rights management, voice recognition, and sound reproduction.

In combination with the touchscreen 112, the display controller 156, the touch module 130, the graphics module 132, and the text-based input module 134, the contacts module 137 may be configured to manage an address book or a contacts list (for example, stored in an application program internal status 192 of the contacts module 137 in the memory 102 or a memory 370), including: adding a name to the address book; deleting a name from the address book: associating a phone number, an email address, an actual address, or other information with a name; associating an image with a name; classifying and categorizing names; providing a phone number or an email address to initiate and/or facilitate communication via the phone module 138, the videoconferencing module 139, the email client module 140, or the IM module 141; and the like.

In combination with the RF circuitry 108, the audio circuitry 110, the speaker 111, the microphone 113, the touchscreen 112, the display controller 156, the touch module 130, the graphics module 132, and the text-based input module 134, the phone module 138 may be configured to: enter a character sequence corresponding to a phone number, access one or more phone numbers in the address book 137, modify an entered phone number, dial a corresponding phone number, make/answer a call, and disconnect or hang up the call when the call is completed. As described above, the wireless communications may use any one of a plurality of communications standards, protocols, and technologies.

In combination with the RF circuitry 108, the audio circuitry 110, the speaker 111, the microphone 113, the touchscreen 112, the display controller 156, the optical sensor 164, the optical sensor controller 158, the touch module 130, the graphics module 132, the text-based input module 134, the contacts list 137, and the phone module 138, the videoconferencing module 139 includes executable instructions for initiating, conducting, and ending a video conference between the user and one or more other participants based on user instructions.

In combination with the RF circuitry 108, the touchscreen 112, the display controller 156, the touch module 130, the graphics module 132, and the text-based input module 134, the email client module 140 includes executable instructions for creating, sending, receiving, and managing an email in response to user instructions. In combination with the image management module 144, the email client module 140 makes it easy to create and send an email including a static image or a video image taken by the camera module 143.

In combination with the RF circuitry 108, the touchscreen 112, the display controller 156, the touch module 130, the graphics module 132, and the text-based input module 134, the instant messaging module 141 includes executable instructions for entering a character sequence corresponding to an instant message, modifying a previously entered character, transmitting a corresponding instant message (for example, a phone-based instant message using the Short Message Service (SMS) or Multimedia Message Service (MMS) protocol, or an Internet-based instant message using the XMPP, the SIMPLE, or the IMPS), receiving an instant message, and viewing the received instant message. In some embodiments, the transmitted and/or received instant message may include a graphic, a photo, an audio file, a video file, and/or another attachment supported in the MMS and/or the Enhanced Message Service (EMS). As used in this specification, the "instant message" includes both a phone-based message (for example, a message sent by using the SMS or the MMS) and an Internet-based message (for example, a message sent by using the XMPP the SIMPLE, or the IMPS).

In combination with the RF circuitry 108, the touchscreen 112, the display controller 156, the touch module 130, the graphics module 132, the text-based input module 134, the GPS module 135, the maps module 154, and the music player module 146, the exercise support module 142 includes executable instructions for creating a workout (for example, including a time, a distance, and/or a calorie consumption goal); communicating with an exercise sensor (an athletic device); receiving data from the exercise sensor; calibrating a sensor for exercise monitoring; selecting and playing music for exercise; and displaying, storing, and transmitting exercise data.

In combination with the touchscreen 112, the display controller 156, the optical sensor 164, the optical sensor controller 158, the touch module 130, the graphics module 132, the digital image pipeline 161 (which converts raw data from the optical sensor into a final image or video), and the image management module 144, the camera module 143 includes an executable instruction for capturing a static image or a video (including a video stream) and storing the image or the video into the memory 102 (for example, in the digital camera film 159), modifying a characteristic of the static image or the video, or deleting a static image or a video from the memory 102 (for example, from the digital camera film 159).

In combination with the touchscreen 112, the display controller 156, the touch module 130, the graphics module 132, the text-based input module 134, and the camera module 143, the image management module 144 includes executable instructions for arranging, modifying (for example, editing), or other manipulating, labeling, deleting, presenting (for example, in a digital slide or a photo album), and storing a static image and/or a video image (including a static image and/or a video image stored in the camera film 159).

In combination with the RF circuitry 108, the touchscreen 112, the display system controller 156, the touch module 130, the graphics module 132, and the text-based input module 134, the browser module 147 includes an executable instruction for browsing the Internet (including searching for, linking to, receiving, and displaying a web page or a part thereof, and an attachment linked to a web page and another file) based on a user instruction.

In combination with the RF circuitry 108, the touchscreen 112, the display system controller 156, the touch module 130, the graphics module 132, the text-based input module 134, the email client module 140, and the browser module 147, the calendar module 148 includes executable instructions for creating, displaying, modifying, and storing a calendar and calendar-associated data (for example, a calendar entry or a to-do list) based on user instructions.

In combination with the RF circuitry 108, the touchscreen 112, the display system controller 156, the touch module 130, the graphics module 132, the text-based input module 134, and the browser module 147, the desktop applet module 149 is a miniature application program (for example, the weather desktop applet 149-1, the stock market desktop applet 149-2, the calculator desktop applet 149-3, the alarm clock applet 149-4, and the dictionary desktop applet 149-5) that may be downloaded and used by the user or a user-created miniature application program (for example, the user-created desktop applet 149-6). In some embodiments, the desktop applet includes an HTML (HyperText Markup Language) file, a CSS (Cascading Style Sheet) file, and a JavaScript file. In some embodiments, the desktop applet includes an XML (Extensible Markup Language) file and a JavaScript file (for example, a Yahoo! desktop applet).

In combination with the RF circuitry 108, the touchscreen 112, the display system controller 156, the touch module 130, the graphics module 132, the text-based input module 134, and the browser module 147, the desktop applet creator module 150 may be used by the user to create a desktop applet (for example, to transfer a user-specified part of a web page to the desktop applet).

In combination with the touchscreen 112, the display system controller 156, the touch module 130, the graphics module 132, and the text-based input module 134, the search module 151 includes an executable instruction for searching, according to a user instruction, the memory 102 for a text, music, a sound, an image, a video, and/or another file matching one or more search criteria (for example, one or more search words specified by the user).

In combination with the touchscreen 112, the display system controller 156, the touch module 130, the graphics module 132, the audio circuitry 110, the speaker 111, the RF circuitry 108, and the browser module 147, the video and music player module 152 includes an executable instruction that allows the user to download and play back recorded music and another sound file that are stored in one or more file formats (such as an MP3 or AAC file), and an executable instruction for displaying, presenting, or playing back a video in another manner (for example, on the touchscreen 112 or on an external display connected via the external port 124). In some embodiments, the device 100 may include functionality of an MP3 player.

In combination with the touchscreen 112, the display controller 156, the touch module 130, the graphics module 132, and the text-based input module 134, the notes module 153 includes executable instructions for creating and managing a note, a to-do list, and the like based on user instructions.

In combination with the RF circuitry 108, the touchscreen 112, the display system controller 156, the touch module 130, the graphics module 132, the text-based input module 134, the GPS module 135, and the browser module 147, the maps module 154 may be configured to receive, display, modify, and store a map and map-associated data (for example, a driving route, data of a shop and another point of interest at a specific location or nearby, and other location-based data) based on user instructions.

In combination with the touchscreen 112, the display system controller 156, the touch module 130, the graphics module 132, the audio circuitry 110, the speaker 111, the RF circuitry 108, the text-based input module 134, the email client module 140, and the browser module 147, the online video module 155 includes instructions that allow the user to access, browse, receive (for example, receive and/or download in a streaming manner), play back (for example, on the touchscreen or on an external display connected via the external port 124), send an email having a link to a specific online video, and manage, in another manner, online videos in one or more file formats (such as H.264). In some embodiments, the instant messaging module 141 instead of the email client module 140 is used to send the link to a specific online video.

In combination with the touchscreen 112, the display system controller 156, the touch module 130, the graphics module 132, the audio circuitry 110, the speaker 111, and the microphone 113, the sound/audio recorder module 163 includes an executable instruction that allows the user to record audio (for example, a sound) in one or more file formats (such as an MP3 or AAC file) and an executable instruction for presenting or playing back a recorded audio file in another manner.

In combination with the touchscreen 112, the display system controller 156, the touch module 130, and the graphics module 132, the notification module 165 includes an executable instruction for displaying a notification or an alarm (such as an incoming message, an incoming call, a calendar event reminder, or an application program event) on the touchscreen 112.

Each of the foregoing modules and application programs corresponds to a set of executable instructions for executing the foregoing one or more functions and the method (for example, a computer-implemented method and another information processing method that are described in this specification) described in this application. These modules (namely, instruction sets) do not need to be implemented as separate software programs, processes, or modules. Therefore, various subgroups of these modules may be combined or rearranged in another manner in various embodiments. In some embodiments, the memory 102 may store a subgroup of the foregoing modules and data structures. In addition, the memory 102 may store another module and data structure that are not described above.

In some embodiments, the device 100 is such a device that operations of a group of functions predefined on the device are performed by using only a touchscreen and/or a touchpad. A quantity of physical input control devices (such as a push button or a dial pad) on the device 100 may be reduced by using the touchscreen and/or the touchpad as a main input control device for operations of the device 100.

The group of predefined functions that can be performed by using only the touchscreen and/or the touchpad include navigation between user interfaces. In some embodiments, when the touchpad is touched by the user, the device 100 is navigated to a primary menu, a main menu, or a root menu from any user interface that can be displayed on the device 100. In such embodiments, the touchpad may be referred to as a "menu button". In some other embodiments, a menu button may be a physical push button or another physical input control device rather than the touchpad.

Figure 1B:
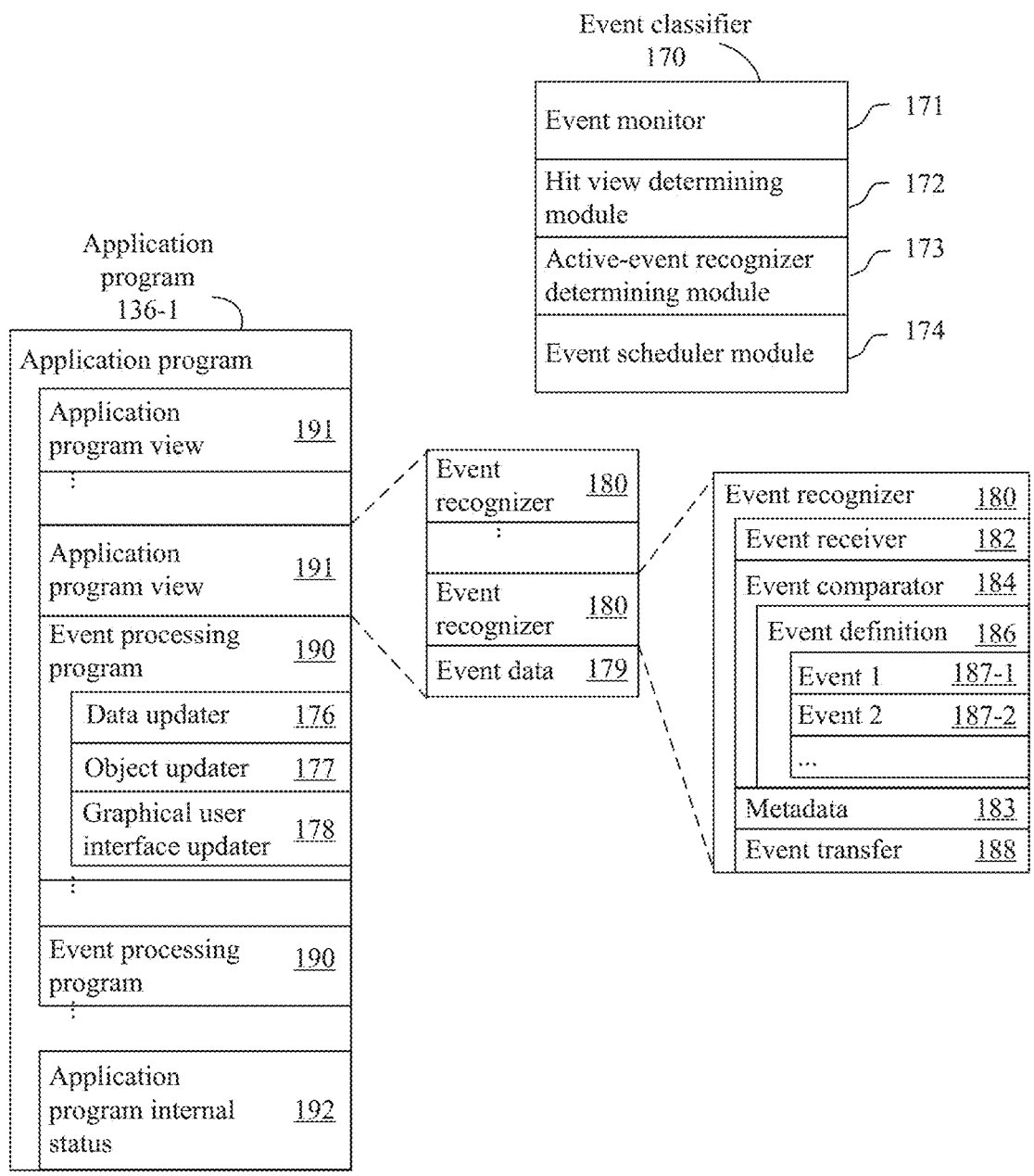
FIG. 1B is a block diagram of an example component for event processing according to some embodiments.

FIG. 1B is a block diagram of an example component for event processing according to some embodiments. In some embodiments, the memory 102 (in FIG. 1A) or the memory 370 (in FIG. 3) includes an event classifier 170 (for example, in the operating system 126) and a corresponding application program 136-1 (for example, any one of the foregoing application programs 137 to 151, 155, and 380 to 390).

The event classifier 170 receives event information and determines the application program 136-1 to which the event information needs to be transferred and an application program view 191 of the application program 136-1. The event classifier 170 includes an event monitor 171 and an event scheduler module 174. In some embodiments, the application program 136-1 includes the application program internal status 192. The application program internal status 192 indicates a current application program view displayed on the touch-sensitive display 112 when the application program is active or is being executed. In some embodiments, the device/global internal status 157 is used by the event classifier 170 to determine an application program that is currently active, and the application program internal status 192 is used by the event classifier 170 to determine the application program view 191 to which the event information needs to be transferred.

In some embodiments, the application program internal status 192 includes other information, for example, one or more of the following: resumption information to be used when the application program 136-1 resumes being executed, user interface status information indicating information that is being displayed by the application program 136-1 or information ready to be displayed by the application program 136-1, a status queue for enabling the user to return to a previous state or view of the application program 136-1, and a repetition/revocation queue of a previous action taken by the user.

The event monitor 171 receives event information from the peripheral device interface 118. The event information includes information about a subevent (for example, a user touch on the touch-sensitive display 112, which is used as a part of a multi-touch gesture). The peripheral device interface 118 transmits information received by the peripheral device interface 118 (by using the audio circuitry 110) from the I/O subsystem 106 or a sensor (for example, the proximity sensor 166), the accelerometer 168, and/or the microphone 113. The information received by the peripheral device interface 118 from the I/O subsystem 106 includes information from the touch-sensitive display 112 or the touch-sensitive surface.

In some embodiments, the event monitor 171 sends a request to the peripheral device interface 118 at predetermined intervals. As a response, the peripheral device interface 118 transmits event information. In other embodiments, the peripheral device interface 118 transmits event information only when a significant event (for example, when an input that is greater than a predetermined noise threshold is received and/or an input that exceeds predetermined duration is received) occurs.

In some embodiments, the event classifier 170 further includes a hit view determining module 172 and/or an active-event recognizer determining module 173.

When the touch-sensitive display 112 displays more than one view, the hit view determining module 172 provides a software process for determining a place in which the subevent has occurred in one or more views. The view includes a control and another element that can be seen by the user on the display.

Another aspect of a user interface associated with an application program is a view, which is sometimes also referred to as an application program view or a user interface window in this specification, and in which information is displayed and a touch-based gesture occurs. An application program view (of a corresponding application program) in which a touch is detected may correspond to a programming level in an application program or a programming level in a view hierarchical structure. For example, a lowest level view in which a touch is detected may be referred to as a hit view, and an event set recognized as a correct input may be at least partially determined based on a hit view that starts from an initial touch of a touch-based gesture.

The hit view determining module 172 receives information related to a subevent of the touch-based gesture. When an application program has a plurality of views that are organized in a hierarchical structure, the hit view determining module 172 recognizes a hit view as a lowest view, in the hierarchical structure, that should process the subevent. In most cases, the hit view is a lowest level view in which an initiation subevent (that is, the first subevent in a subevent sequence that forms an event or a potential event) occurs. Once the hit view is recognized by the hit view determining module, the hit view usually receives all subevents related to a same touch or input source corresponding to the hit view that is recognized.

The active-event recognizer determining module 173 determines a view, in the view hierarchical structure, that should receive a specific subevent sequence. In some embodiments, the active-event recognizer determining module 173 determines that only the hit view should receive a specific subevent sequence. In other embodiments, the active-event recognizer determining module 173 determines that all views including a subevent physical location are active views, and therefore determines that all the active views should receive a specific subevent sequence. In other embodiments, even if a touch subevent is entirely limited to an area associated with a specific view, a higher view in the hierarchical structure still remains as an active view.

The event scheduler module 174 schedules event information to an event recognizer (for example, an event recognizer 180). In an embodiment including the active-event recognizer determining module 173, the event scheduler module 174 transfers the event information to an event recognizer determined by the active-event recognizer determining module 173. In some embodiments, the event scheduler module 174 stores the event information in an event queue, and the event information is retrieved by a corresponding event receiver module 182.

In some embodiments, the operating system 126 includes the event classifier 170. Alternatively, the application program 136-1 includes the event classifier 170. In another embodiment, the event classifier 170 is an independent module, or is a part of another module (for example, the touch/movement module 130) stored in the memory 102.

In some embodiments, the application program 136-1 includes a plurality of event processing programs 190 and one or more application program views 191, each of which includes an instruction for processing a touch event that occurs in a corresponding view of a user interface of the application program. Each application program view 191 of the application program 136-1 includes one or more event recognizers 180. Usually, the corresponding application program view 191 includes a plurality of event recognizers 180. In other embodiments, one or more of the event recognizers 180 are a part of an independent module. The independent module is, for example, a user interface toolkit (not shown) or a higher level object from which the application program 136-1 inherits a method and another characteristic. In some embodiments, the corresponding event processing program 190 includes one or more of the following: a data updater 176, an object updater 177, a GUI updater 178, and/or event data 179 received from the event classifier 170. The event processing program 190 may update the application program internal status 192 by using or invoking the data updater 176, the object updater 177, or the GUI updater 178. Alternatively, one or more of the application program views 191 include one or more corresponding event processing programs 190. In addition, in some embodiments, one or more of the data updater 176, the object updater 177, and the GUI updater 178 are included in the corresponding application program view 191.

A corresponding event recognizer 180 receives event information (for example, the event data 179) from the event classifier 170, and identifies an event by using the event information. The event recognizer 180 includes an event receiver 182 and an event comparator 184. In some embodiments, the event recognizer 180 further includes at least one subgroup of the following: metadata 183 and an event transfer instruction 188 (which may include a subevent transfer instruction).

The event receiver 182 receives event information from the event classifier 170. The event information includes information about a subevent, for example, a touch or a touch movement. Based on the subevent, the event information further includes other information such as a location of the subevent. When the subevent relates to a touch movement, the event information may further include a speed and a direction of the subevent. In some embodiments, an event includes that a device rotates from one orientation to another orientation (for example, rotates from a portrait orientation to a landscape orientation, or vice versa), and the event information includes corresponding information related to a current orientation (also referred to as a device posture) of the device.

The event comparator 184 compares the event information with a definition of a predefined event or subevent, and based on the comparison, determines an event or a subevent, or determines or updates a status of an event or a subevent. In some embodiments, the event comparator 184 includes an event definition 186. The event definition 186 includes a definition of an event (for example, a predefined subevent sequence), for example, an event 1 (187-1), an event 2 (187-2), and another event. In some embodiments, subevents in the event 187 include, for example, a touch start, a touch end, a touch movement, a touch cancellation, and multi-touch. In an instance, a definition of the event 1 (187-1) is a double-tap on a displayed object. For example, the double-tap includes a first touch of a predetermined length of time on the displayed object (a touch starts), a first lift of a predetermined length of time (the touch ends), a second touch of a predetermined length of time on the displayed object (a touch starts), and a second lift of a predetermined length of time (the touch ends). In another instance, a definition of the event 2 (187-2) is a drag on a displayed object. For example, the drag includes a touch (or a contact) of a predetermined length of time on the displayed object, a movement of the touch on the touch-sensitive display 112, and a lift of the touch (the touch ends). In some embodiments, the event further includes information for one or more associated event processing programs 190.

In some embodiments, the event definition 187 includes a definition of an event for a corresponding user interface object. In some embodiments, the event comparator 184 performs a hit test to determine a user interface object associated with a subevent. For example, in application program views of three user interface objects displayed on the touch display 112, when a touch is detected on the touch-sensitive display 112, the event comparator 184 performs a hit test to determine which one of the three user interface objects is associated with the touch (subevent). If each displayed object is associated with a corresponding event processing program 190, the event comparator determines, by using a result of the hit test, which event processing program 190 should be activated. For example, the event comparator 184 selects an event processing program associated with an object and a subevent that trigger the hit test.

In some embodiments, the definition of the corresponding event 187 further includes a delay action. The delay action delays transfer of the event information until it is determined that the subevent sequence indeed corresponds to or indeed does not correspond to an event type of the event recognizer.

When determining that a subevent string does not match any event in the event definition 186, the corresponding event recognizer 180 enters an event impossible state, an event failure state, or an event end state, and then ignores a subsequent subevent of the touch-based gesture. In this case, for the hit view, another event recognizer (if any) that remains active continues to track and process an on-going subevent of the touch-based gesture.

In some embodiments, the corresponding event recognizer 180 includes the metadata 183 having a configurable attribute, identifier, and/or list that indicates how an event transfer system performs subevent transfer of an active-event recognizer. In some embodiments, the metadata 183 includes a configurable attribute, identifier, and/or list that indicates how event recognizers can interact with each other. In some embodiments, the metadata 183 includes a configurable attribute, identifier, and/or list that indicates whether a subevent is transferred to a view or a changing level in a programming hierarchical structure.

In some embodiments, when one or more specific subevents of an event are recognized, a corresponding event recognizer 180 activates an event processing program 190 associated with the event. In some embodiments, the corresponding event recognizer 180 transfers event information associated with the event to the event processing program 190. Activating the event processing program 190 is different from sending (and delaying sending) the subevent to a corresponding hit view. In some embodiments, the event recognizer 180 issues an identifier associated with a recognized event, and an event processing program 190 associated with the identifier receives the identifier and performs a predefined process.

In some embodiments, the event transfer instruction 188 includes a subevent transfer instruction for transferring event information related to a subevent but not activating an event processing program. On the contrary, the subevent transfer instruction transfers event information to an event processing program associated with a subevent string or transfers event information to an active view. The event processing program associated with the subevent string or associated with the active view receives the event information and performs a predetermined process.

In some embodiments, the data updater 176 creates and updates data used in the application program 136-1. For example, the data updater 176 updates a phone number used in the contacts module 137, or a video file stored and used in the video player module 145. In some embodiments, the object updater 176 creates and updates an object used in the application program 136-1. For example, the object updater 177 creates a new user interface object, or updates a location of a user interface object. The GUI updater 178 updates a GUI. For example, the GUI updater 178 prepares display information, and sends the display information to the graphics module 132 for display on the touch-sensitive display.

In some embodiments, the event processing program 190 includes or has rights of access to the data updater 176, the object updater 177, and the GUI updater 178. In some embodiments, the data updater 176, the object updater 177, and the GUI updater 178 are included in a single module of a corresponding application program 136-1 or application program view 191. In other embodiments, they are included in two or more software modules.

It should be understood that, the foregoing descriptions of processing a user touch event on the touch-sensitive display are also applicable to a user input in another form that is performed by using an input device to operate the electronic device 100 (inputs are not all initiated on the touchscreen), for example, coordination between a mouse movement and a mouse button press (having or not having a single-keyboard or multi-keyboard press or hold), a user movement on the touchpad such as a tap, a drag, or a scroll, a stylus input, a movement of the device, a verbal instruction, a detected eye movement, a biometric feature input, and/or any combination thereof. They may be used as an input corresponding to a subevent of an event to be recognized by the definition.

FIG. 2 shows an electronic device 100X) having a touchscreen 112 according to some embodiments. The touchscreen can display one or more graphics in a user interface (UI) 200. In this embodiment and another embodiment described below, a user may select one or more of these graphics by using, for example, one or more fingers 202 (not drawn in scale in the figure) or one or more styluses 203 (not drawn in scale in the figure) to make a gesture on these graphics. In some embodiments, when the user releases a contact with the one or more graphics, the one or more graphics are selected. In some embodiments, the gesture may include one or more taps, one or more slides (from left to right, from right to left, upward, and/or downward), and/or a flick (from right to left, from left to right, upward, and/or downward) of a finger in contact with the device 100. In some embodiments, an accidental contact with a graphic does not result in selection of the graphic. For example, when a gesture corresponding to selection is a tap, a swipe gesture that swipes on an application program icon does not result in selection of a corresponding application program.

The device 100 may further include one or more physical buttons, for example, a "home screen" or menu button 204. As described above, the menu button 204 may be used to navigate to any application program 136 in a group of application programs that can run on the device 100. Alternatively, in some embodiments, the menu button is implemented as a softkey in a GUI displayed on the touchscreen 112.

In an embodiment, the device 100 includes the touchscreen 112, the menu button 204, a push button 206 for switching on/off and locking the device, (one or more) volume adjustment buttons 208, a subscriber identity module (SIM) card slot 210, a headset jack 212, and a docking/charging external port 124. The push button 206 may be used to switch on/off the device by pressing the button and holding the button in a pressed state for a predefined time interval; lock the device by pressing the button and releasing the button before a predefined time interval expires, and/or unlock the device or initiate an unlock process. In an optional embodiment, the device 100 may further receive, by using a microphone 113, a voice input for activating or deactivating some specific functions.

FIG. 3 is a block diagram of an example electronic device having a display and a touch-sensitive surface according to some embodiments. A device 300 is not necessarily portable.

In some embodiments, the device 300 is a laptop computer, a desktop computer, a tablet computer, a multimedia player device, a navigation device, an educational device (for example, a learning toy for kids), a game system, or a control device (for example, a household or industrial controller). The device 300 usually includes one or more processing units (CPU) 310, one or more network or other communications interfaces 360, a memory 370, and one or more communications buses 320 for interconnecting these components. In some embodiments, the processing units 310 include an image signal processor and a dual-core or multi-core processor. The communications bus 320 may include a circuitry (sometimes referred to as a chip set) that interconnects system components and that controls communication between the system components. The device 300 includes an input/output (I/O) interface 330 having a display 340. The display 340 is usually a touchscreen display. The I/O interface 330 may further include a keyboard and/or a mouse (or another pointing device) 350 and a touchpad 355. The device 300 further includes an optical sensor 164 and an optical sensor controller 158. The memory 370 includes a high-speed random-access memory, for example, a DRAM, an SRAM, a DDR RAM, or another random-access solid-state storage device; and may include a non-volatile memory such as one or more magnetic disk storage devices, optical disc storage devices, flash memory devices, or other non-volatile solid-state storage devices. Optionally, the memory 370 may include one or more storage devices located remotely from the CPU 310. In some embodiments, the memory 370 stores a program, a module, and a data structure, or a subgroup thereof similar to the program, the module, and the data structure that are stored in the memory 102 of the electronic device 100 (in FIG. 1). In addition, the memory 370 may store another program, module, and data structure that do not exist in the memory 102 of the electronic device 100. For example, the memory 370 of the device 300 may store a drawing module 380, a presentation module 382, a word processing module 384, a web page creation module 386, a disk editing module 388, and/or a spreadsheet module 390, while the memory 102 of the electronic device 100 (in FIG. 1) may not store these modules.

Each of the foregoing recognized elements in FIG. 3 may be stored in one or more storage devices mentioned above. Each of the foregoing recognized modules corresponds to a set of instructions for performing the foregoing functions. The foregoing recognized modules or programs (that is, instruction sets) do not need to be implemented as separate software programs, processes, or modules, and therefore various subgroups of these modules may be combined or rearranged in another manner in various embodiments. In some embodiments, the memory 370 may store a subgroup of the foregoing modules and data structures. In addition, the memory 370 may store another module and data structure that are not described above.

Now, an embodiment of a user interface ("UI") that may be implemented on the electronic device 100 is described.

FIG. 4 shows an example user interface used for an application program menu on the electronic device 100 according to some embodiments. A similar user interface may be implemented on the device 300. In some embodiments, a user interface 400 includes the following elements or a subgroup or a superset thereof:

a signal strength indicator 402 for wireless communications (for example, a mobile phone signal and a Wi-Fi signal);

time 404;
a Bluetooth indicator 405;
a battery status indicator 406;
a tray 408 including icons of frequently used application programs, where the frequently used application programs are, for example, as follows:
   a phone 138, which may include an indicator 414 indicating a quantity of missed calls or voice mail messages;
   an email client 140, which may include an indicator 410 indicating a quantity of unread emails;
   a browser 147; and
   a video and music player 152, which is also referred to as an iPod (a trademark of Apple Inc.) module 152; and
icons of other application programs, where the other application programs are, for example, as follows:
   IM 141;
   image management 144;
   camera 143;
   weather 149-1;
   stock market 149-2;
   exercise support 142;
   calendar 148;
   alarm clock 149-4;
   maps 154;
   notes 153;
   settings 412, which provides access to settings of the device 100 and various application programs 136 of the device 100; and
   an online video module 155, which is also referred to as a YouTube (a trademark of Google Inc.) module 155.

In addition, although the following examples are mainly provided with reference to finger inputs (for example, a single-finger touch, a single-finger tap gesture, and a single-finger swipe gesture), it should be understood that in some embodiments, one or more of the finger inputs are replaced with an input (for example, a stylus input) from another input device.

Now, embodiments of a user interface ("UI") that can be implemented on an electronic device (such as the device 300 or the electronic device 100) having an accelerometer and/or a magnetometer, and an associated process are described.

FIG. 5a and FIG. 5b show processes for automatically starting an application according to some embodiments. User interfaces in these figures are used to illustrate the following described processes and/or functions, including processes and/or functions in FIG. 6 and FIG. 7.

FIG. 5 shows processes in which the electronic device 100 automatically starts an application.

A user sits in an automobile and puts the electronic device close to a vehicle magnetic suction bracket (refer to the leftmost diagram in FIG. 5a). The electronic device invokes an internal algorithm module and determines, based on data detected by the accelerometer and/or the magnetometer, that the mobile phone is attached onto the vehicle magnetic suction bracket (refer to the middle diagram in FIG. 5a). The electronic device automatically starts a preset application. Alternatively, the electronic device starts an application selected based on a use habit of the user. Alternatively, the electronic device starts a recommendation menu, and the recommendation menu displays an application selected based on a use habit of the user. Herein, the electronic device automatically starts a driving mode, and the driving mode is also an application (refer to the rightmost diagram in FIG. 5a). For another possible design, refer to FIG. 5b, which is the same as the process in FIG. 5a, except that the electronic device automatically starts a different application. The following describes a specific implementation process of the mobile phone.

Figure 6:
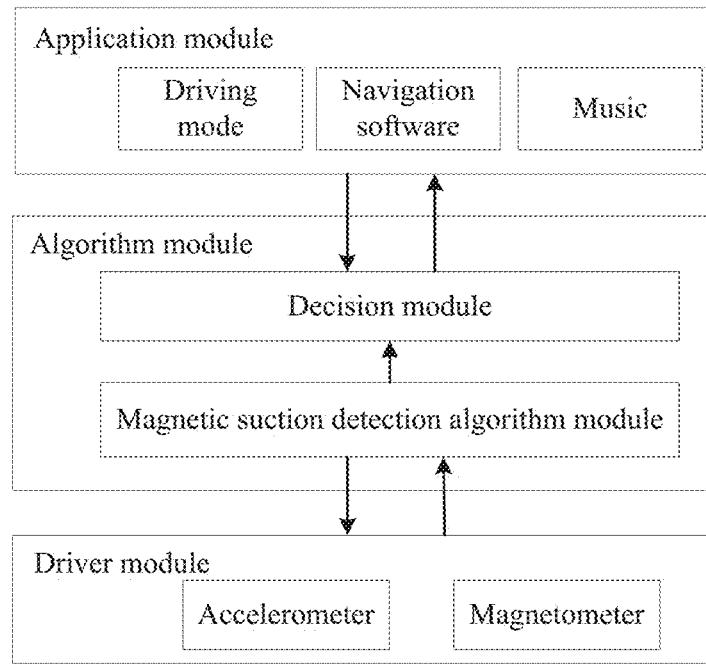
FIG. 6 is a schematic diagram of layers and connection relationships of software modules in an electronic device.

FIG. 6 shows layers and connection relationships of software modules in an electronic device. A driver module is configured to drive an accelerometer and a magnetometer. Signaling interaction and data transmission can be performed between the driver module and an algorithm module. For example, when a processor or a coprocessor of the electronic device runs a magnetic suction detection algorithm module, data detected by the accelerometer and/or the magnetometer is obtained by using the driver module, and periods for obtaining the data detected by the accelerometer and/or the magnetometer may also be separately adjusted (or synchronously adjusted) by using the driver module. The algorithm module separately performs signaling interaction and data transmission with an application module and the driver module. The magnetic suction detection algorithm module outputs a detection result of a magnetic suction event (the magnetic suction event is that the electronic device is attached onto a vehicle magnetic suction bracket), and sends the detection result to a decision module. The decision module determines a response action on the magnetic suction event based on the detection result, and sends the response action to the application module. The application layer receives and performs the response action reported by the decision module, for example, starts a driving mode application or navigation software.

The following specifically describes a magnetic suction detection algorithm. It should be noted that, when obtaining detection data buffered by a sensor (the accelerometer and/or the magnetometer) in a buffer, the electronic device may obtain data detected by the accelerometer and the magnetometer. In this way, during subsequent determining, it can be more accurately determined that the mobile phone is attached onto the vehicle magnetic suction bracket. In another design manner, the electronic device may alternatively obtain only data detected by the accelerometer or only data detected by the magnetometer. A disadvantage of such a design is that accuracy of a subsequent determining result is decreased. In subsequent descriptions of this specification, obtaining the data detected by the accelerometer and the magnetometer is used as an example, and constitutes no limitation to the essence of this solution.

Figure 7:
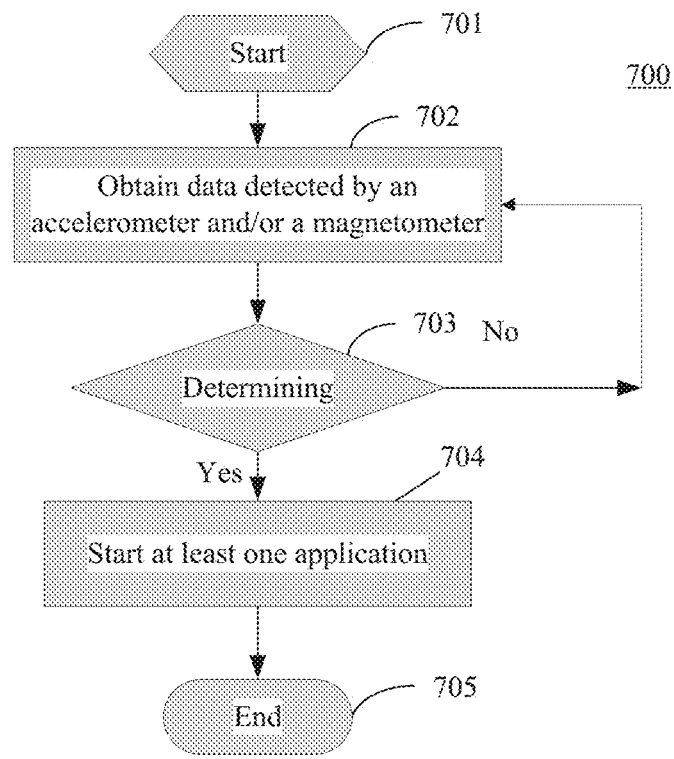
FIG. 7 is a flowchart of a method for starting an application according to some embodiments.

FIG. 7 is a flowchart of a method 700 for starting an application according to some embodiments. The method 700 is performed by an electronic device (for example, the device 300 in FIG. 3 or the electronic device 100 in FIG. 1) having a display, an accelerometer, a magnetometer, and a plurality of application programs (including a camera application program). In some embodiments, the display is a touchscreen display, and there is a touch-sensitive surface on the display. In some embodiments, the display is separate from the touch-sensitive surface. Some operations in the method 700 may be combined, and/or an order of some operations may be changed.

As described below, the method 700 provides a more efficient manner to start an application. With the help of the method, a user can start an application automatically without needing to perform any operation, thereby saving power and improving user experience.

The user sits in an automobile, and before driving, the user attaches the electronic device onto a vehicle magnetic suction bracket. The electronic device obtains a first group of data detected by the accelerometer and a second group of data detected by the magnetometer (702). The electronic device determines whether a part or all of data in the first group of data and a part or all of data in the second group of data meet a preset condition (703). If a determining result of the electronic device is that the electronic device is not attached onto the vehicle magnetic suction bracket, the electronic device continues to perform step 702. If a determining result of the electronic device is that the electronic device is attached onto the vehicle magnetic suction bracket, the electronic device starts at least one application (704). It should be understood that, the at least one application includes a preset application or an application selected by the electronic device based on a use habit of the user. Alternatively, the electronic device starts a recommendation menu, and the recommendation menu displays an application selected based on a use habit of the user.

Figure 8:
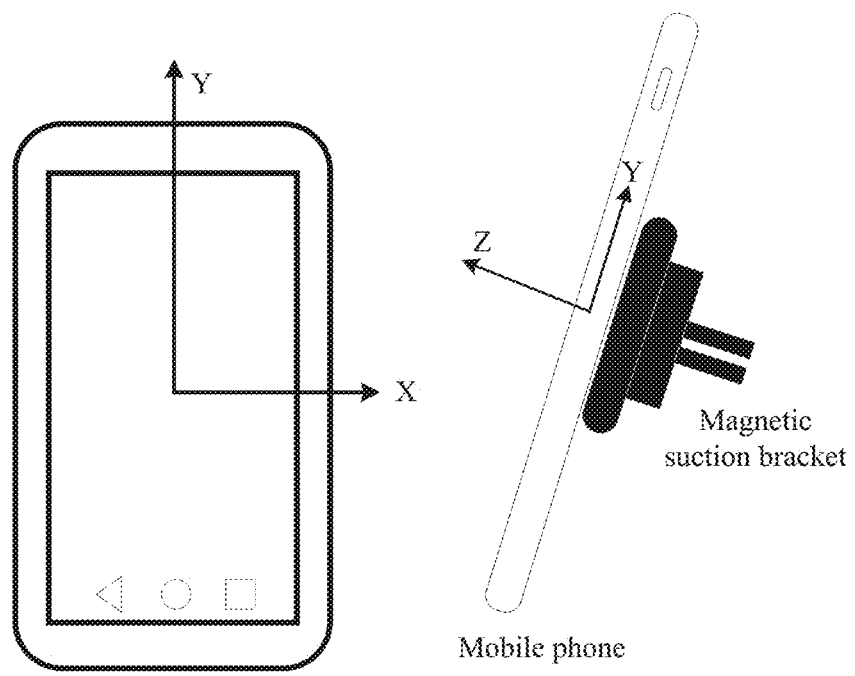
FIG. 8 is a schematic direction diagram of three axes in measurement of a sensor.

FIG. 8 is a schematic direction diagram of three axes in measurement of a sensor.

As shown in FIG. 8, a screen of an electronic device is facing up. Coordinate axes of the sensor are defined. A direction from the left side to the right side of the electronic device is an X-axis. A direction from the bottom to the top of the electronic device is a Y-axis. A direction from the back side to the screen of the electronic device is a Z-axis. X, Y, and Z form a right-handed coordinate system. Three-axis measurement data of an accelerometer is denoted as $a_x$, $a_y$, and $a_z$. Three-axis measurement data of a magnetometer is denoted as $m_x$, $m_y$, and $m_z$. The accelerometer and the magnetometer may work at different sampling frequencies.

The following specifically describes how the electronic device determines, based on the data detected by the accelerometer and the magnetometer, that the electronic device is attached onto a vehicle magnetic suction bracket.

1. The Accelerometer Detects a Collision.

Figure 9:
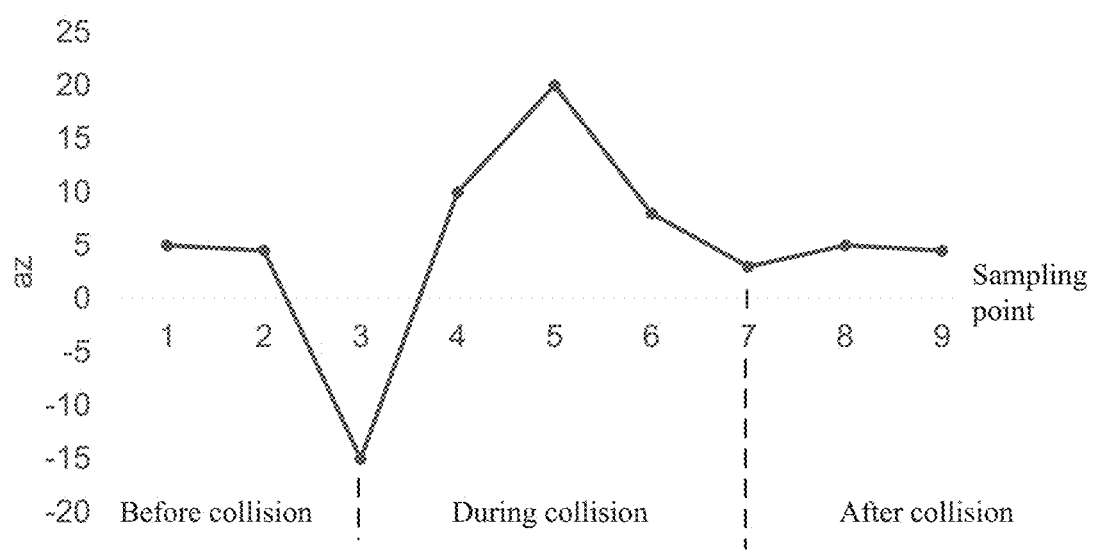
FIG. 9 is a schematic variation diagram of Z-axis measurement data $a_z$ of acceleration during one collision.

The electronic device approaches the vehicle magnetic suction bracket, then the electronic device collides with the vehicle magnetic suction bracket, and finally the electronic device is securely attached onto the vehicle magnetic suction bracket. The accelerometer measures this collision process. The collision occurs mainly along the Z-axis direction. FIG. 9 shows variations of Z-axis measurement data $a_z$ of acceleration during one collision.

With reference to FIG. 9, a magnetic suction collision may be divided into three processes: before the collision, during the collision, and after the collision:

(1) Before the collision, the electronic device is attracted by the vehicle magnetic suction bracket, and approaches the vehicle magnetic suction bracket along a negative direction of the Z-axis at an increasing speed. As reflected in data of the accelerometer, the data $a_z$ decreases.

(2) During the collision, a collision force acts on the back side of the electronic device, a direction of the collision force is along a positive direction of the Z-axis of the electronic device from the back side of the electronic device to the front side of the electronic device, the Z-axis data of the accelerometer instantly increases, and then the collision force disappears quickly. As reflected in data of the accelerometer, the data $a_z$ decreases quickly after reaching a peak.

(3) After the collision, the electronic device is securely attached onto the vehicle magnetic suction bracket. As reflected in data of the accelerometer, the data $a_z$ tends to level off.

Figure 10:
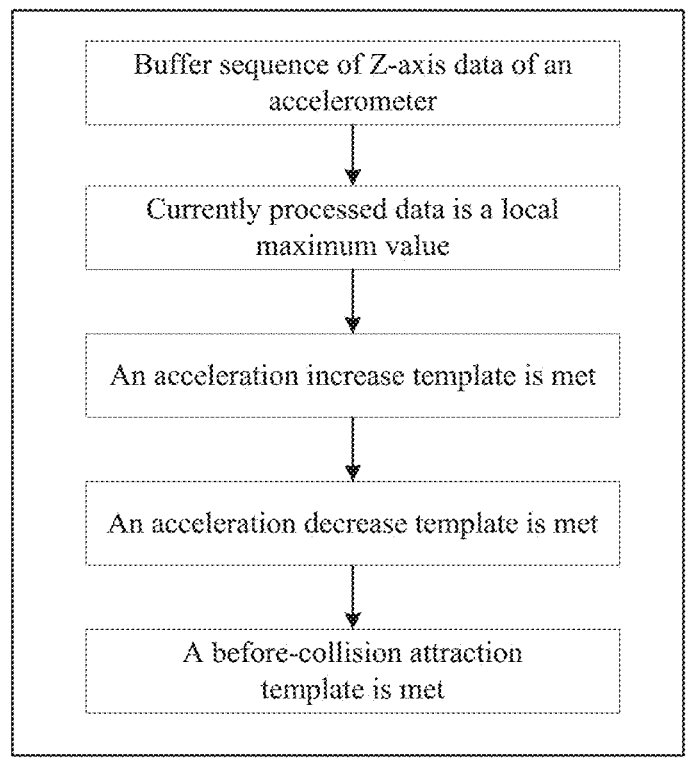
FIG. 10 is a flowchart of a collision detection method.

FIG. 10 is a flowchart of a collision detection method. Based on the foregoing analysis of the data $a_z$, referring to FIG. 10, a detection process for determining a collision is as follows:

Step 1: Determine whether currently processed acceleration data is a local maximum value.

Step 2: Determine whether acceleration data meets an increase template, that is, an acceleration increased value within a specified time exceeds a preset value.

Step 3: Determine whether acceleration data meets a decrease template, that is, an acceleration decreased value within a specified time exceeds a preset value.

Step 4: Determine whether acceleration data meets a before-collision attraction template, that is, the acceleration decreased value within a specified time exceeds the preset value, and an absolute value after the decrease is less than the preset value.

The acceleration data in the foregoing four steps is Z-axis measurement data of the accelerometer. If the foregoing four steps are all met, it is considered that one magnetic suction collision occurs. It should be noted that, an order of the foregoing four steps is not fixed.

Without loss of generality, it is assumed that the currently processed data is Z-axis measurement data $a_z(k)$ of the accelerometer, and a corresponding data buffer sequence is $a_z(k-m), \ldots, a_z(k-2), a_z(k-1), a_z(k), a_z(k+1), a_z(k+2), \ldots, a_z(k+n)$, where m and n are specified data buffer lengths. The following specifically describes how to implement the foregoing collision detection:

Step 1: Determine whether $a_z(k)$ is a local maximum value, that is:

$$a_z(k) > a_z(k-1) \text{ and } a_z(k) < a_z(k+1), \text{ and}$$

if $a_z(k)$ is a local maximum value, go to a next step.

Step 2: Find a local minimum value $a_z(k-i)$ before a moment k, and if the following condition is met, go to a next step:

$$i < T1, \text{ and } a_z(k) - a_z(k-i) > H1$$

where T1 is a specified time window length, and H1 is a specified acceleration threshold constant.

Step 3: Find a local minimum value $a_z(k+j)$ after the moment k, and if the following condition is met, go to a next step:

$$i+j < T2, \text{ and } a_z(k) - a_z(k+j) > H2$$

where T2 is a specified time window length, and H2 is a specified acceleration threshold constant.

Step 4: If the following condition is met within moments [k−i−T3, k−i], it is considered that one magnetic suction collision occurs:

$$\max\{a(k-i-r) - a(k-i), r=1,2, \ldots, T3\} > H3, \text{ and}$$
$$a_z(k-i) < H4$$

where T3 is a specified time window length, and H3 and H4 are specified acceleration threshold constants.

2. The Magnetometer Detects a Magnetic Field Strength.

Figure 11:
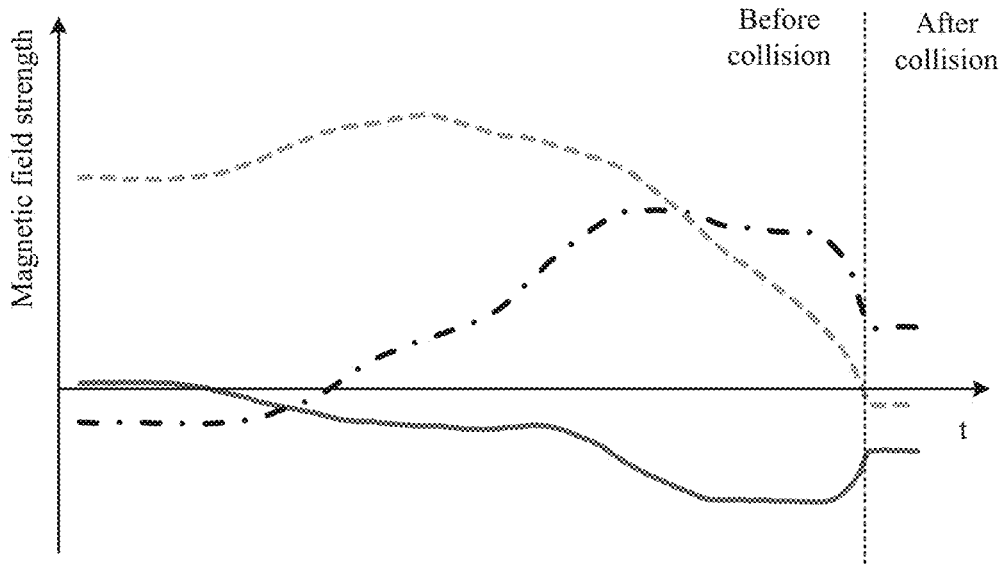
FIG. 11 is a schematic diagram of curves of three-axis measurement data of a magnetometer when an electronic device approaches a vehicle magnetic suction bracket.

FIG. 11 shows curves of three-axis measurement data of the magnetometer when the electronic device approaches the vehicle magnetic suction bracket.

The vehicle magnetic suction bracket includes a permanent magnet. As shown in FIG. 11, when the electronic device approaches the vehicle magnetic suction bracket, a magnetic field strength measured by the magnetometer varies. Based on a value of the magnetic field strength measured by the magnetometer, it may be determined whether an object that the electronic device collides with is a vehicle magnetic suction bracket. In this specification, two methods are proposed to determine a magnetic field strength: determining an after-collision magnetic field strength, and determining a magnetic field strength variation before and after a collision.

Figure 12:
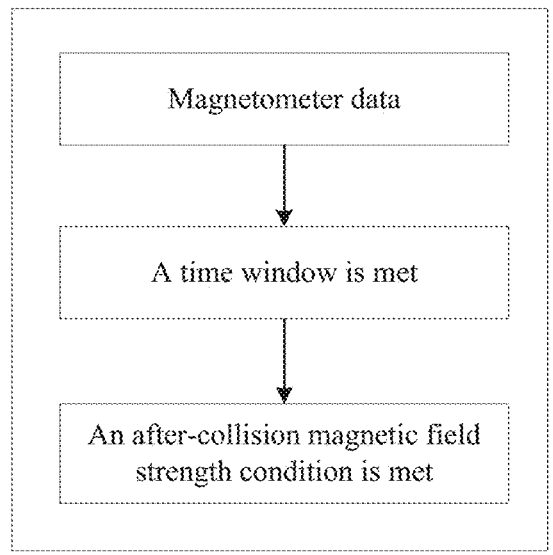
FIG. 12 is a schematic diagram of determining an after-collision magnetic field strength.

FIG. 12 is a schematic diagram of determining an after-collision magnetic field strength.

Method 1: Determining an after-Collision Magnetic Field Strength

Step 1: After detecting a magnetic suction collision, the electronic device records a collision moment, and determines whether a difference between a moment corresponding to currently processed magnetometer data and the collision moment meets a specified time window threshold.

Step 2: The electronic device determines whether the current magnetometer data meets a specified threshold condition.

If the foregoing two steps are both met, the electronic device determines that a collided object is a vehicle magnetic suction bracket.

An example is used for description. Without loss of generality, it is assumed that the moment at which the collision is detected is $T_b$, the current moment is t, and the current measurement data of the magnetometer is $<m_x, m_y, m_z>$:

Step 1: Determine whether the current moment meets a time window that is:

$$t-T_b<T4$$

where $T_4$ is a specified time window length.

Step 2: Determine whether the measurement data of the magnetometer meets:

$$m_x>M_{X1} \text{ and } m_x<M_{X2},$$

$$m_y>M_{Y1} \text{ and } m_y<M_{Y2}, \text{ and}$$

$$m_z>M_{Z1} \text{ and } m_z<M_{Z2}$$

where $M_{X1}$, $M_{X2}$, $M_{Y1}$, $M_{Y2}$, $M_{Z1}$, and $M_{Z2}$ are specified magnetic field strength thresholds.

If the foregoing two steps are both met, it is considered that a magnetic field condition is met. It should be noted that, during actual application, the inequality conditions in step 2 do not need to be all met. If all the inequality conditions in step 2 are met, a false-recognition rate can be reduced, but a magnetic suction detection precision may also be reduced. If the electronic device contains an easily magnetized medium, when a magnetic field strength of the vehicle magnetic suction bracket is large, the medium is magnetized, and therefore the magnetometer measures a superimposed magnetic field generated by the magnetized medium and the vehicle magnetic suction bracket, instead of the magnetic field strength of the vehicle magnetic suction bracket. Correspondingly, erroneous detection occurs in the method in which it is determined, based on an after-collision magnetic field strength, whether a collided object is a vehicle magnetic suction bracket. Therefore, the other method is determining a relative magnetic field strength variation before and after the electronic device is attached.

Figure 13:
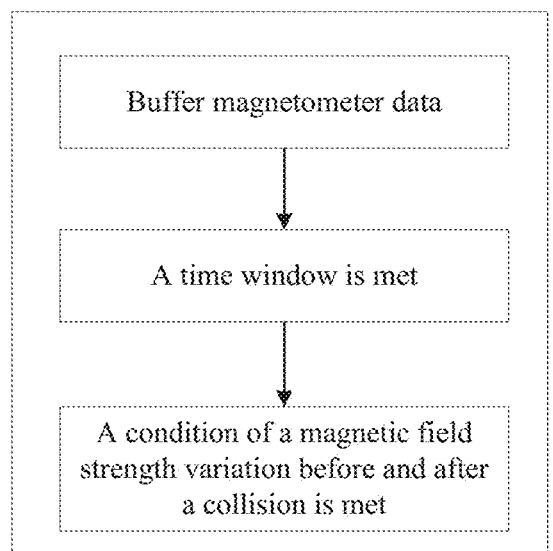
FIG. 13 is a schematic diagram of determining a magnetic field strength variation before and after a collision.

FIG. 13 is a schematic diagram of determining a magnetic field strength variation before and after a collision.

Method 2: Determining a Magnetic Field Strength Variation Before and after a Collision Step 1: After detecting a collision, the electronic device records a collision moment, and determines whether a difference between a moment corresponding to currently processed magnetometer data and the collision moment meets a specified time window threshold.

Step 2: The electronic device compares the currently processed magnetometer data with buffered magnetometer data, and if a difference between the currently processed magnetometer data and magnetometer data at at least one historical moment meets a specified threshold condition, it is considered that a collided object is a vehicle magnetic suction bracket.

The buffered magnetometer data is updated in real time. If a time difference between the current moment and a moment corresponding to latest measurement in the buffered data exceeds a specified time window, oldest measurement is removed from the buffered data, and the current measurement of the magnetometer is added to the buffer.

An example is used for description. Without loss of generality, it is assumed that the moment at which the collision is detected is $T_b$, the current moment is t, the current measurement data of the magnetometer is $<m_x, m_y, m_z>$, and N pieces of historical buffered magnetometer data are:

$$<m_{x1},m_{y1},m_{z1}>,<m_{x2},m_{y2},m_{z2}>,\ldots,<m_{xN},m_{yN},m_{yN}>.$$

Step 1: Determine whether the current moment meets a time window, that is:

$$t-T_b<T1$$

where $T_4$ is a specified time window length.

Step 2: Determine a variation of the measurement data of the magnetometer, and there is at least one piece of historical sampling data i, meeting:

$$m_x-m_{xi}>M_{XV1} \text{ and } m_x-m_{xi}<M_{XV2},$$

$$m_y-m_{yi}>M_{YV1} \text{ and } m_y-m_{yi}<M_{YV2}, \text{ and}$$

$$m_z-m_{zi}>M_{ZV1} \text{ and } m_z-m_{zi}<M_{ZV2}$$

where $M_{XV1}$, $M_{XV2}$, $M_{YV1}$, $M_{YV2}$, $M_{ZV1}$, and $M_{ZV2}$ are specified magnetic field strength variation thresholds.

If the foregoing two steps are both met, it is considered that a magnetic field condition is met, and the electronic device determines that a collided object is a vehicle magnetic suction bracket. It should be noted that, during actual application, the inequality conditions in step 2 do not need to be all met. If all the inequality conditions in step 2 are met, a false-recognition rate can be reduced, but a magnetic suction detection precision may also be reduced.

In a possible design, to further reduce an erroneous determining rate, a posture of the electronic device may be further detected.

3. Detect a Posture of the Electronic Device.

To further reduce the false-recognition rate, after the magnetic suction collision condition and the magnetic field condition are both met, whether the electronic device is in a reading posture is further determined. The reading posture means that after the electronic device is attached onto the vehicle magnetic suction bracket, the user can naturally read the electronic device while sitting in a driving seat. For example, when the mobile phone is horizontally placed and vertically inverted, the electronic device is in a non-reading posture. Whether the electronic device is in the reading posture may be detected by determining whether values of a Z-axis component and a Y-axis component of the accelerometer respectively meet specified threshold intervals.

Figure 14:
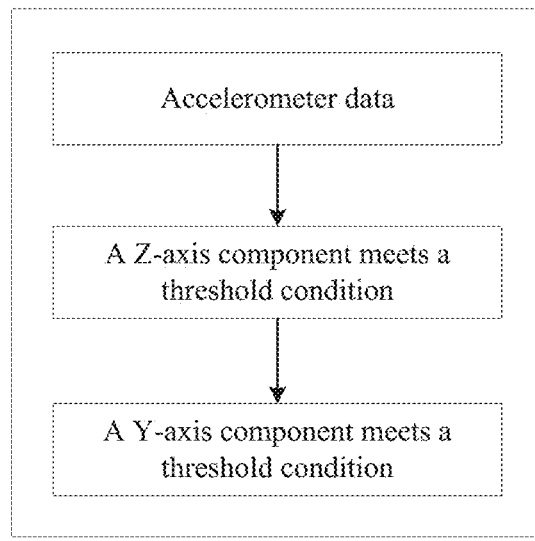
FIG. 14 is a schematic diagram of a method for detecting a posture of an electronic device after a collision.

FIG. 14 is a schematic diagram of a method for detecting a posture of an electronic device after a collision.

An example is used for description.

Step 1: Determine whether a Z-axis component of the accelerometer meets $a_{z1}<a_z<a_{z2}$, where $a_{z1}$ and $a_{z2}$ are specified threshold constants, and a suggested value range is $-9.8<a_{z1}<0<a_{z2}<9.8$.

Step 2: Determine whether a Y axis-component of the accelerometer meets $a_y > a_{y,1}$, where $a_{y1}$ is a specified constant, and a suggested value range is $a_{y1} > -9.8$.

If the foregoing two steps are both met, the electronic device considers that the electronic device is in the reading posture.

As for the decision module in FIG. 6, a magnetic suction detection module reports a magnetic suction event to the decision module after determining the magnetic suction event. The decision module determines a response action on the magnetic suction event based on a decision mechanism. An application module performs the response action.

Figure 15:
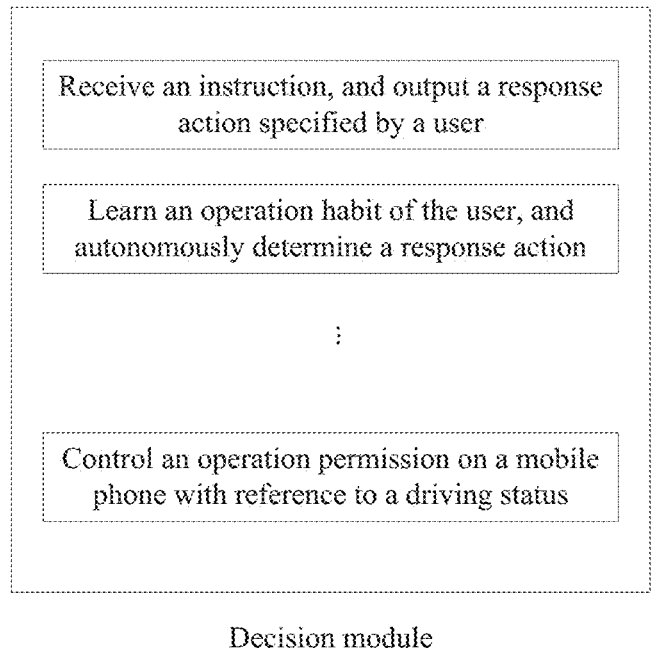
FIG. 15 is a schematic diagram of running of a decision module.

FIG. 15 is a schematic diagram of running of a decision module. The decision module includes a plurality of decision mechanisms, such as:

receiving an instruction specified by a user, and outputting a response action preset by the user; if the user does not preset the instruction, after it is detected that the electronic device is attached onto the vehicle magnetic suction bracket, learning, by the decision module, an operation habit of the user, and autonomously determining a response action after learning for a period of time; and determining an operation permission on the mobile phone with reference to a driving status (vehicle being stationary, stopped and waiting, running, or the like), for example, the mobile phone may be operated freely when being stationary, display a message when being stopped and waiting, and shield a message when running.

Figure 16:
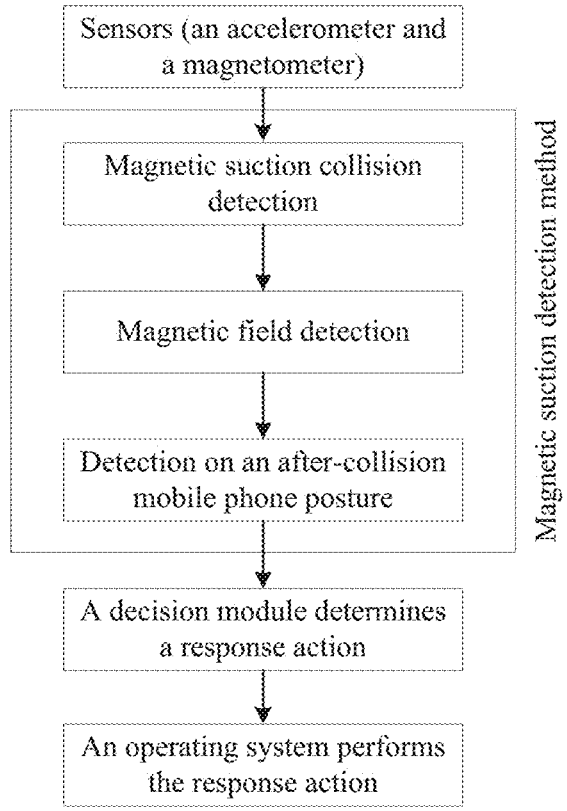
FIG. 16 is a flowchart of a method for starting an application according to some embodiments.

FIG. 16 is a schematic diagram of an embodiment of starting an application.

Step 1: Sensors work at specified sampling rates, where an accelerometer and a magnetometer may have different sampling rates.

Step 2: Perform magnetic suction collision detection, where if a Z-axis data sequence of the accelerometer meets a magnetic suction collision detection condition, it is considered that a magnetic suction collision occurs, and a next step is performed.

Step 3: Perform magnetic field detection (the foregoing magnetic field detection method 1 or method 2 may be used), where if a magnetic field condition is met, a next step is performed.

Step 4: Perform detection on an after-collision electronic device posture, where if the mobile phone is in a reading device posture, a next step is performed (step 4 is optional).

Step 5: The decision module outputs a response action on a magnetic suction event.

Step 6: An operating system performs the response action.

Figure 17:
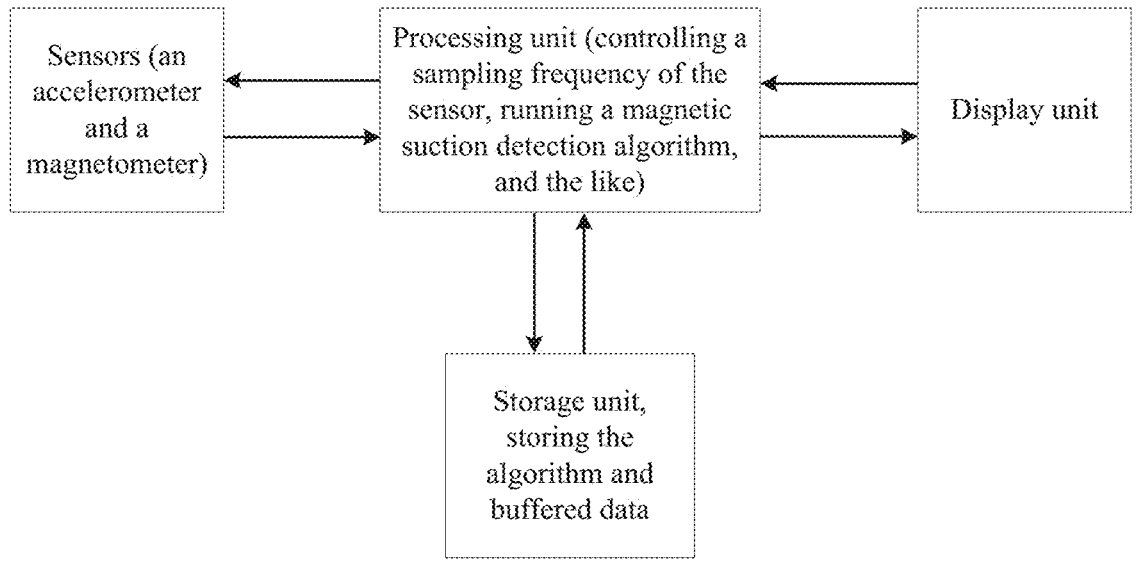
FIG. 17 is a schematic diagram of a connection relationship between hardware in an electronic device.

FIG. 17 is a schematic diagram of a connection relationship between hardware in an electronic device.

Sensors in this specification include an accelerometer and a magnetometer. The accelerometer detects a collision and a posture of the electronic device, and the magnetometer detects a magnetic field strength.

A storage unit stores a magnetic suction detection method and an algorithm file corresponding to a decision module, and buffers sensor data. A processing unit sends a collection instruction and a sampling frequency of the sensor to the sensor, invokes the algorithm and the data in the storage unit for processing, and performs a response action corresponding to a magnetic suction event. A display unit presents a response result of the magnetic suction event, and allows a user to configure, by using the display unit, the response action corresponding to the magnetic suction event.

It should be noted that, for the starting at least one application (704) in FIG. 7, the at least one application may be an application (for example, navigation software or music player software) preset by the user, or the user may not need to preset an application. After detecting that the electronic device is attached onto the vehicle magnetic suction bracket, the electronic device learns an operation habit of the user, to obtain a usual habit of operating the electronic device by the user while driving. After learning for a period of time, when detecting a magnetic suction event, the electronic device actively recommends an application frequently used by the user to the user. A recommendation manner may be displaying, by using a floating window, a function frequently used by the user, or actively starting the application (for example, navigation software) frequently used by the user. A user operation learning process of the electronic device may be continuous, a learning result may be continuously updated, and a response to a magnetic suction event continuously varies with the learning result.

Figure 18:
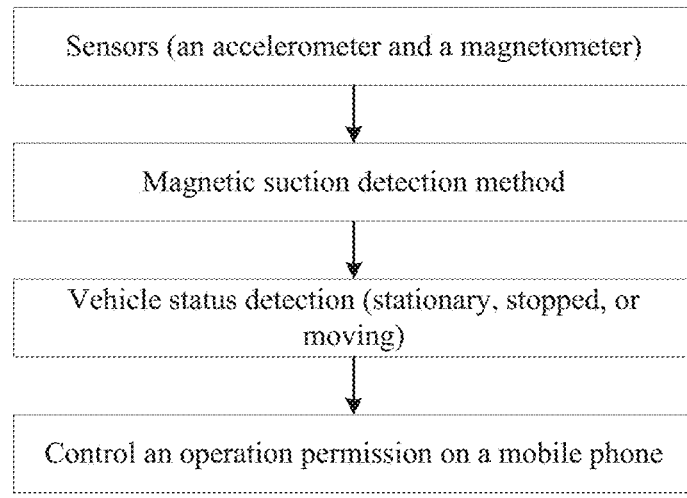
FIG. 18 is a flowchart of a method for starting an application according to some embodiments.

FIG. 18 is a schematic diagram of an embodiment of starting an application.

An electronic device detects a magnetic suction event. The electronic device may determine that a current user of the electronic device is a driver. Further, an operation permission on the electronic device is controlled with reference to a running status of a vehicle, to ensure driving safety. For example, it is detected, by using a sensor, whether the vehicle is in a stationary, stopped, or moving state. If the vehicle is in a stationary state, it indicates that a vehicle engine has not been started, and the user has all operation permissions on the mobile phone. If the vehicle is in a stopped state, it indicates that the vehicle engine has been started, but the vehicle is in the stopped state, and the user has some operation permissions on the electronic device, for example, displaying a message. If the vehicle is in a moving state, the user has only an operation permission on the electronic device that is defined in a driving mode.

Figure 19:
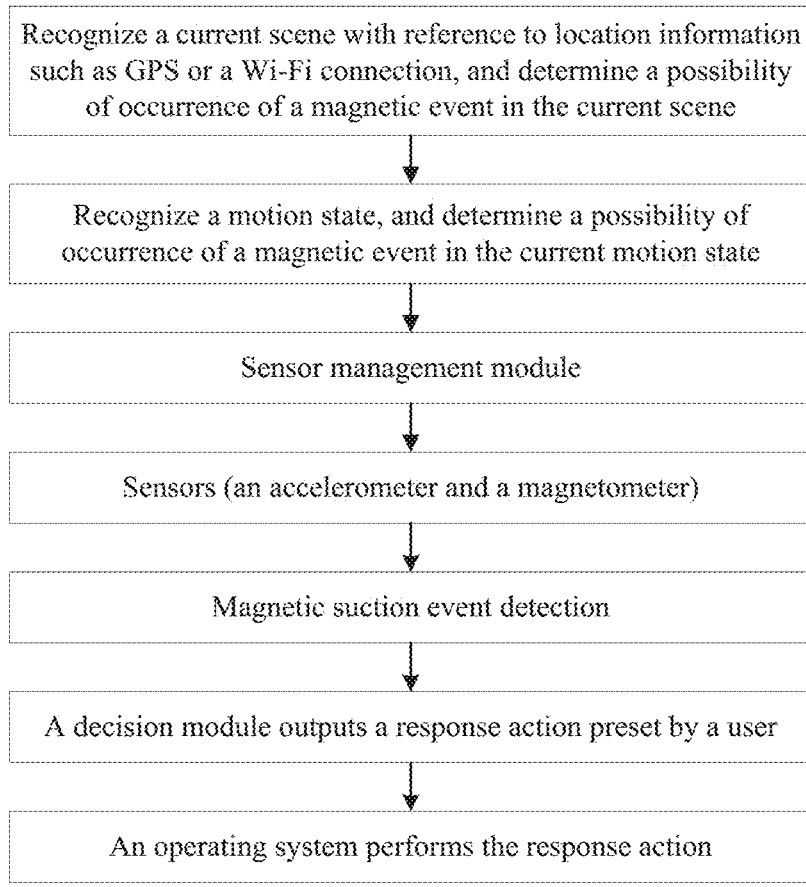
FIG. 19 is a flowchart of a method for starting an application according to some embodiments.

FIG. 19 is a flowchart of a method for starting an application according to some embodiments.

Occurrence of a magnetic suction event is highly associated with a use scenario of an electronic device. It may be considered that a probability of occurrence of the magnetic suction event in a driving scene is high, and a probability of occurrence of the magnetic suction event in a non-driving scene is low. The magnetic suction detection method is enabled or disabled based on a probability of occurrence of a magnetic suction event by comprehensively using location information and motion status information, and sampling frequency of the sensor is adjusted, thereby effectively reducing power consumption of the magnetic suction detection method, and reducing a false-recognition rate.

Step 1: Determine a location. The electronic device recognizes, with reference to location information such as GPS or a Wi-Fi connection, that a current location is a home, an office, a supermarket, or the like, and determines a possibility of occurrence of a magnetic suction event in a current scenario. For example, based on GPS and/or a Wi-Fi connection, the electronic device determines that the electronic device is located in a home, a magnetic suction event is impossible to occur, and a confidence coefficient is 0; the electronic device determines that the electronic device is in an office or a supermarket, and a confidence coefficient is 1. If the confidence coefficient is greater than 0, a next step is performed.

Step 2: Determine a state. The electronic device determines, by using a status recognition module, that a current state of the electronic device is stationary, walking, running, going up and down stairs, climbing, being in a high-speed railway, being in a metro, being in an automobile, cycling, or the like, and the electronic device determines a possibility of occurrence of a magnetic suction event in a current motion state. For example, if the state is being stationary, a magnetic suction event is impossible to occur, and a confidence coefficient is 0: if the state is a motion state of going up and down stairs or climbing, a probability of occurrence of a magnetic suction event is low, and a confidence coefficient is 1; if the state is the state of being in an automobile, a confidence coefficient is 2. If the confidence coefficient is greater than 0, a next step is performed.

Step 3: The electronic device dynamically adjusts a sampling rate of a sensor based on a confidence coefficient of occurrence of a magnetic suction event. For example, when the confidence coefficient is 0, no sensor is invoked, and the magnetic suction detection algorithm is disabled. When the confidence coefficient is 1, the accelerometer is invoked at a sampling rate FA, the magnetometer is invoked at a sampling rate FML, and the magnetic suction detection algorithm is enabled. When the confidence coefficient is 2, the accelerometer is invoked at a sampling rate FA, the magnetometer is invoked at a sampling rate FMH, and the magnetic suction detection algorithm is enabled. A magnetic suction event detection method is dynamically enabled or disabled with reference to the location information and the motion status information, thereby reducing power consumption of magnetic suction event detection, reducing a false-recognition rate, and improving user experience.

Figure 20:
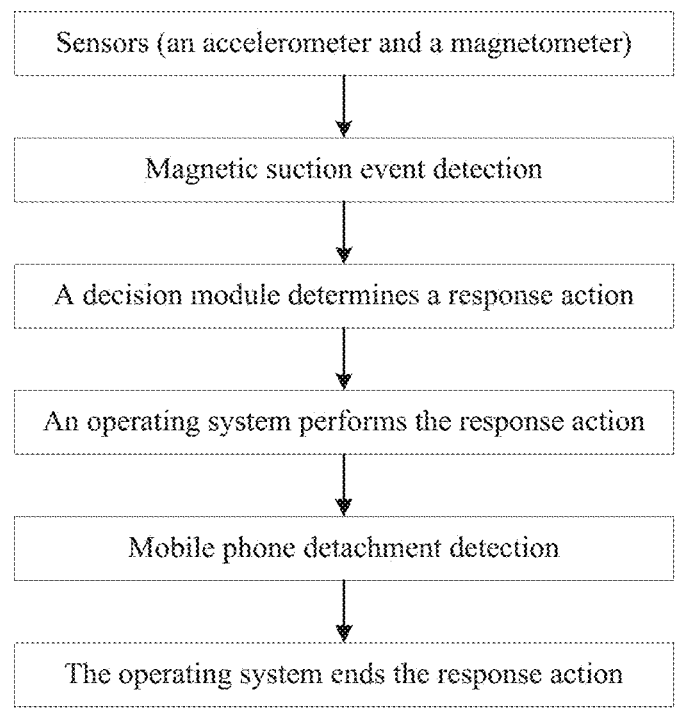
FIG. 20 is a flowchart of a method for starting an application according to some embodiments.

FIG. 20 is a flowchart of a method for starting an application according to some embodiments.

After an operating system performs a response action, electronic device detachment detection is started. The operating system ends the response action when it is determined that the electronic device is detached from a vehicle magnetic suction bracket.

Electronic device detachment detection: Electronic device detachment is an inverse process of an electronic device attachment process. An electronic device detachment detection method is similar to a magnetic suction detection method. An acceleration template of electronic device detachment is defined, and data collected by an accelerometer is matched against the acceleration template of electronic device detachment. If the data successfully matches the template, it is determined that a detachment action occurs on the electronic device, and a magnetic field strength variation before and after detachment is determined based on magnetic field strength data collected by a magnetometer. If the magnetic field strength variation meets a specified threshold condition, it is determined that the electronic device is detached from a magnetic suction bracket.

Figure 21:
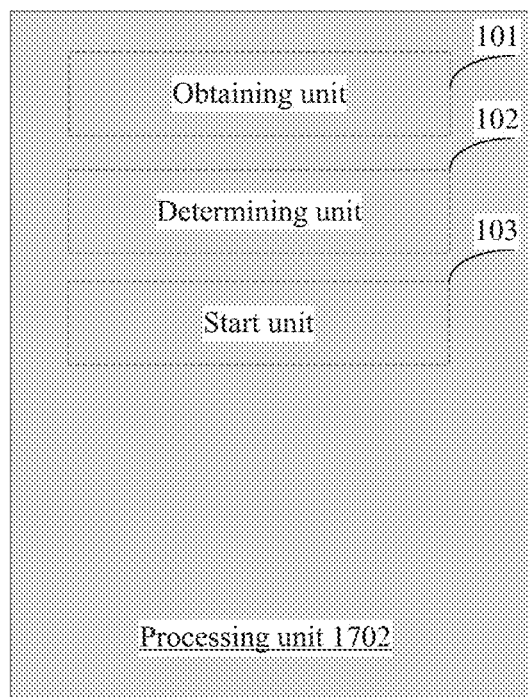
FIG. 21 is a functional block diagram of a processing unit in FIG. 17.

According to some embodiments, FIG. 21 is a functional block diagram of a processing unit in FIG. 17. Functional blocks of the processing unit may be implemented by hardware, software, or a combination of hardware and software, to implement the principle of the present invention. A person skilled in the art can understand that, the functional blocks shown in FIG. 21 may be combined or separated into subblocks, to implement the principle of the present invention. Therefore, the description in this specification may support any possible combination or separation or further definition of the functional blocks described in this specification. It should be understood that, the processing unit may be a processor, or may be a coprocessor.

As shown in FIG. 21, a processing unit 1702 includes: an obtaining unit 101, where the obtaining unit 101 is configured to obtain a first group of data detected by the accelerometer and a second group of data detected by the magnetometer: a determining unit 102, where the determining unit 102 is coupled to the obtaining unit 101, and the determining unit is configured to determine, on the basis that a part or all of data in the first group of data and a part or all of data in the second group of data meet a preset condition, that the electronic device is attached onto a vehicle magnetic suction bracket; and a start unit 103, where the start unit 103 is coupled to the determining unit, and the start unit 103 is configured to start at least one application, where the at least one application is a preset application or an application determined by the electronic device based on a preset rule.

Functions of the processing unit 1702 are described above. A person of ordinary skill in the art may understand that, the following functions correspond to various embodiments of the electronic device, system, apparatus, method, graphical user interface, information processing apparatus (for example, a processor chip or a processor chip set), and computer-readable storage medium described in this specification, and various combinations thereof are combinations that a person of ordinary skill in the art can directly and undoubtedly conceive of after understanding this specification.

It should be understood that, a person of ordinary skill in the art may appreciate, by understanding this specification, that the operations described above with reference to FIG. 6 to FIG. 20 may be implemented by the components shown in FIG. 1A and FIG. 1B. Similarly, a person skilled in the art clearly understands how another process may be implemented based on the components shown in FIG. 1A and FIG. 1B.

For a purpose of explanation, the foregoing description is provided by using specific embodiments. However, the foregoing example discussion is not intended for exhaustion, nor intended to limit the present invention to a disclosed precise form. Based on the foregoing teaching content, many modification forms and variation forms are possible. Embodiments are selected and described to fully illustrate the principle of the present invention and actual application of the principle, so that another person skilled in the art can fully use the present invention and various embodiments that have various modifications applicable to a conceived specific purpose.

What is claimed is:

1. An electronic device, comprising:
one or more processors;
an accelerometer coupled to the one or more processors;
a magnetometer coupled to the one or more processors;
a memory coupled to the one or more processors, wherein the memory stores a plurality of application programs and a computer-executable instruction, wherein the one or more processors are configured to execute the computer-executable instruction to configure the electronic device to:
obtain a first group of data detected by the accelerometer and a second group of data detected by the magnetometer;
determine that the electronic device is attached onto a vehicle magnetic suction bracket based on a part or all of the first group of data detected by the accelerometer and based on a part or all of the second group of data detected by the magnetometer; and
start at least one of the plurality of application programs that is a preset application or an application determined by the electronic device based on a preset rule.

2. The electronic device of claim 1, wherein the one or more processors are configured to execute the computer-executable instruction to configure the electronic device to determine that the electronic device is attached onto the vehicle magnetic suction bracket based on the part or all of the first group of data detected by the accelerometer and based on the part or all of the second group of data detected by the magnetometer comprises:
- determining that one collision occurs on the electronic device based on the part or all of the first group of data detected by the accelerometer; and
- determining that a strength of a magnetic field in which the electronic device is located within a preset length of time after the collision occurs on the electronic device is greater than a first threshold or a strength variation of the magnetic field is greater than a second threshold based on the part or all of the second group of data detected by the magnetometer.

3. The electronic device of claim 1, wherein the one or more processors are configured to execute the computer-executable instruction to further configure the electronic device to determine that the electronic device is in a reading posture based on the part or all of the first group of data detected by the accelerometer.

4. The electronic device of claim 1, wherein the one or more processors are configured to execute the computer-executable instruction to further configure the electronic device to:
- obtain a third group of data detected by the accelerometer and a fourth group of data detected by the magnetometer;
- determine that the electronic device is detached from the vehicle magnetic suction bracket based on a part or all of the third group of data detected by the accelerometer and based on a part or all of the fourth group of data detected by the magnetometer; and
- close the at least one of the plurality of application programs that was started.

5. The electronic device of claim 1, wherein the one or more processors are configured to execute the computer-executable instruction to further configure the electronic device to determine, before obtaining the first group of data detected by the accelerometer and the second group of data detected by the magnetometer, that a probability that the electronic device is in an automobile is greater than a third threshold based on at least one of a location of the electronic device or a motion status of the electronic device, wherein the motion status comprises being in a started automobile or a non-stationary state.

6. The electronic device of claim 1, wherein the one or more processors are configured to execute the computer-executable instruction to further configure the electronic device to:
- determine that a probability that the electronic device is in an automobile is greater than a third threshold based on the at least one of a location of the electronic device or a motion status of the electronic device; and
- shorten a first period for obtaining data detected by the accelerometer and shorten a second period for obtaining data detected by the magnetometer, wherein the motion status comprises being in a started automobile or a non-stationary state.

7. The electronic device of claim 1, wherein the one or more processors are configured to execute the computer-executable instruction to further configure the electronic device to:
- disable m applications of the plurality of application programs based on a determination that a probability that the electronic device is in a running automobile is greater than a fourth threshold, wherein the probability that the electronic device is in the running automobile is based on at least one of a location of the electronic device or a motion status of the electronic device, wherein m is an integer not less than one; and
- disable n applications of the plurality of application programs based on a determination that a probability that the electronic device is in an automobile in a stopped state is greater than a fifth threshold, wherein the probability that the electronic device is in the automobile in the stopped state is based on at least one of the location of the electronic device or the motion status of the electronic device, wherein n is an integer not less than one, and wherein m is greater than n.

8. The electronic device of claim 1, wherein before starting the at least one of the plurality of application programs, the one or more processors are configured to execute the computer-executable instruction to further configure the electronic device to:
- display an unlock user interface; and
- start the at least one of the plurality of application programs after receiving a correct unlock instruction.

9. The electronic device of claim 1, wherein before starting the at least one of the plurality of application programs, the one or more processors are configured to execute the computer-executable instruction to further configure the electronic device to:
- determine a security coefficient of the at least one of the plurality of application programs; and
- either directly start the at least one of the plurality of application programs when the security coefficient is greater than a fifth threshold, or
- display an unlock user interface and start the at least one of the plurality of application programs after a correct unlock instruction is received when the security coefficient is not greater than the fifth threshold.

10. A method, applied to an electronic device having an accelerometer and a magnetometer, wherein the method comprises:
- obtaining a first group of data detected by the accelerometer and a second group of data detected by the magnetometer;
- determining that the electronic device is attached onto a vehicle magnetic suction bracket based on a part or all of the first group of data and a part or all of the second group of data meeting a preset condition; and
- starting at least one application, wherein the at least one application is a preset application or an application determined by the electronic device based on a preset rule.

11. The method of claim 10, wherein determining that the electronic device is attached onto the vehicle magnetic suction bracket based on the part or all of the first group of data and the part or all of the second group of data meeting the preset condition comprises:
- determining that one collision occurs on the electronic device based on the part or all of the first group of data; and
- determining that a strength of a magnetic field in which the electronic device is located within a preset length of time after the collision occurs on the electronic device is greater than a first threshold or a strength variation of the magnetic field is greater than a second threshold based on the part or all of the second group of data.

12. The method of claim 10, further comprising determining that the electronic device is in a reading posture based on the part or all of the first group of data after determining that the electronic device is attached onto the vehicle magnetic suction bracket based on the part or all of the first group of data and the part or all of the second group of data meeting the preset condition.

13. The method of claim 10, further comprising:
obtaining a third group of data detected by the accelerometer and a fourth group of data detected by the magnetometer;
determining that the electronic device is detached from the vehicle magnetic suction bracket on a basis that a part or all of the third group of data and a part or all of the fourth group of data meet a preset condition; and
closing the at least one application that is started.

14. The method of claim 10, wherein before obtaining the first group of data detected by the accelerometer and the second group of data detected by the magnetometer, the method further comprises determining that a probability that the electronic device is in an automobile is greater than a third threshold based on at least one of a location of the electronic device or a motion status of the electronic device, wherein the motion status comprises being in a started automobile or a non-stationary state.

15. The method of claim 10, further comprising:
determining that a probability that the electronic device is in an automobile is greater than a third threshold based on at least one of a location of the electronic device or a motion status of the electronic device; and
shortening a first period for obtaining data detected by the accelerometer and shortening a second period for obtaining data detected by the magnetometer, wherein the motion status comprises being in a started automobile or a non-stationary state.

16. The method of claim 10, further comprising:
determining, based on at least one of a location of the electronic device or a motion status of the electronic device, that a probability that the electronic device is in a running automobile is greater than a fourth threshold and disabling m applications in the electronic device; and
determining, based on at least one of the location of the electronic device or the motion status of the electronic device, that a probability that the electronic device is in an automobile in a stopped state is greater than a fifth threshold and disabling n applications in the electronic device, wherein the motion status comprises being in a started automobile or a non-stationary state.

17. The method of claim 10, wherein before starting at least one application, the method further comprises:
displaying an unlock user interface; and
starting the at least one application after a correct unlock instruction is received.

18. The method of claim 10, wherein before starting at least one application, the method further comprises:
determining a security coefficient of the at least one application; and
either directly starting the at least one application when the security coefficient of the at least one application is higher than a fifth threshold; or
displaying an unlock user interface and starting the at least one application after a correct unlock instruction is received when the security coefficient of the at least one application is not higher than the fifth threshold.

19. A non-transitory computer-readable storage medium for storing one or more programs, wherein the one or more programs comprise an instruction, and when the instruction is executed by an electronic device having an accelerometer and a magnetometer, the electronic device is configured to perform a method comprising:
obtaining a first group of data detected by the accelerometer and a second group of data detected by the magnetometer;
determining that the electronic device is attached onto a vehicle magnetic suction bracket based on a part or all of the first group of data and a part or all of the second group of data meeting a preset condition; and
starting at least one application, wherein the at least one application is a preset application or an application determined by the electronic device based on a preset rule.

20. The non-transitory computer-readable storage medium of claim 19, wherein determining that the electronic device is attached onto the vehicle magnetic suction bracket based on the part or all of the first group of data and the part or all of the second group of data meeting the preset condition comprises:
determining, by the electronic device based on at least the part or all of the first group of data, that one collision occurs on the electronic device; and
determining, based on at least the part or all of the second group of data, that a strength of a magnetic field in which the electronic device is located within a preset length of time after the collision occurs on the electronic device is greater than a first threshold or a strength variation of the magnetic field is greater than a second threshold.

* * * * *